US008914646B2

(12) United States Patent
Kuno et al.

(10) Patent No.: US 8,914,646 B2
(45) Date of Patent: Dec. 16, 2014

(54) INFORMATION PROCESSING APPARATUS AND INFORMATION PROCESSING METHOD FOR DETERMINING ACCESS PERMISSION

(75) Inventors: Hiroshi Kuno, Kanagawa (JP); Takamichi Hayashi, Tokyo (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 13/463,017

(22) Filed: May 3, 2012

(65) Prior Publication Data
US 2012/0303972 A1    Nov. 29, 2012

(30) Foreign Application Priority Data

May 27, 2011   (JP) .................................. 2011-118576

(51) Int. Cl.
| | |
|---|---|
| *G06F 12/14* | (2006.01) |
| *H04L 29/06* | (2006.01) |
| *H04L 9/32* | (2006.01) |
| *G06F 7/04* | (2006.01) |
| *H04N 7/167* | (2011.01) |
| *H04L 9/08* | (2006.01) |
| *G06F 21/10* | (2013.01) |
| *G11B 20/00* | (2006.01) |
| *G06F 21/62* | (2013.01) |
| *G06F 21/64* | (2013.01) |

(52) U.S. Cl.
CPC .... *G06F 12/1441* (2013.01); *G06F 2221/2107* (2013.01); *G11B 20/00086* (2013.01); *G06F 21/6218* (2013.01); *G11B 20/0021* (2013.01); *H04L 9/0822* (2013.01); *H04L 63/0428* (2013.01); *G06F 21/64* (2013.01); *H04L 9/3294* (2013.01); *H04L 63/0823* (2013.01); *G06F 21/10* (2013.01)

USPC ........... 713/189; 713/156; 713/165; 713/166; 713/168; 726/26; 726/27; 380/201; 380/281

(58) Field of Classification Search
CPC .............. H04L 63/0823; H04L 9/3294; H04L 63/0428; H04L 9/0822; G06F 21/6218; G06F 2221/2107; G06F 21/64; G06F 21/10; G11B 20/00086; G11B 20/0021
USPC ............ 713/189, 156, 165, 166, 168; 726/26, 726/27; 380/201, 281
See application file for complete search history.

(56) References Cited

U.S. PATENT DOCUMENTS

| | | | |
|---|---|---|---|
| 2009/0172825 A1* | 7/2009 | Yi et al. ........................... 726/33 |
| 2010/0205461 A1* | 8/2010 | Satou et al. .................... 713/193 |

(Continued)

OTHER PUBLICATIONS

U.S. Appl. No. 13/593,824, filed Aug. 24, 2012, Kuno, et al.
U.S. Appl. No. 13/673,042, filed Nov. 9, 2012, Kobayashi, et al.
U.S. Appl. No. 13/558,687, filed Jul. 26, 2012, Kuno, et al.

(Continued)

*Primary Examiner* — Aravind Moorthy
(74) *Attorney, Agent, or Firm* — Sony Corporation

(57) ABSTRACT

An information processing apparatus includes a data processor and a storage. The storage is divided into a protected area to which access is limited and a general purpose area which is freely accessible, and configured to store in the general purpose area encrypted content, and an encrypted title key obtained by encrypting a title key to be applied to decrypt the encrypted content, and store in the protected area a binding key applied to encrypt the title key, and a hash value of the encrypted title key. The data processor is configured to determine, in response to a request for access to the protected area from an external apparatus, whether or not to permit the access, and permit, only when access permission determination is made, the access to the protected area.

20 Claims, 13 Drawing Sheets

(56) References Cited

U.S. PATENT DOCUMENTS

2010/0318789 A1* 12/2010 Teal et al. .................. 713/156
2011/0191562 A1* 8/2011 Chou et al. ................. 711/163

OTHER PUBLICATIONS

U.S. Appl. No. 13/556,301, filed Jul. 24, 2012, Kuno, et al.
U.S. Appl. No. 13/562,788, filed Jul. 31, 2012, Kobayashi, et al.

* cited by examiner

INFORMATION PROCESSING APPARATUS AND INFORMATION PROCESSING METHOD FOR DETERMINING ACCESS PERMISSION

BACKGROUND

The present disclosure relates to an information processing apparatus, an information processing method, and a program. In particular, the present disclosure relates to an information processing apparatus, an information processing method, and a program that are, for example, capable of effectively preventing unauthorized use of content to be recorded on a recording medium such as a memory card.

In recent years, as information recording media, various media such as a DVD (digital versatile disc), a Blu-ray Disc (registered trademark), and a flash memory are used. In particular, in recent years, memory cards such as a USB memory installing a large-capacity flash memory are used more and more. A user can record on various information recording media content items such as music and film, and load them into a reproduction apparatus (player) to reproduce the content items.

However, with respect to many content items such as music data and image data, creators or distributors thereof own copyrights or distribution rights, for example. Therefore, when the user is provided with content, a certain limitation is generally imposed thereon. That is, such a control that only a user having a legitimate use right is permitted to use the content for preventing disordered use, for example, unauthorized copy, is made.

For example, an AACS (advanced access content system) is known as a standard regarding a content usage control. The AACS standard defines, for example, a usage control configuration with respect to content recorded on a Blu-ray Disc (registered trademark). Specifically, for example, such an algorithm that content to be recorded on a Blu-ray Disc (registered trademark) is handled as encrypted content and a user who can acquire an encryption key therefor is limited only to a legitimate user is defined.

However, in current AACS rules, a rule regarding a usage control configuration with respect to content recorded on a disk such as a Blu-ray Disc (registered trademark) exists, but, for example, regarding content or the like that is recorded on a flash memory such as a memory card, a sufficient rule does not exist. Therefore, regarding the content recorded on the memory card, there is a fear that protection of a copyright thereof is insufficient. Thus, it is desirable to structure a usage control configuration with respect to content use via a medium such as a memory card.

For example, as the AACS rules, there are the following rules for a usage control configuration with respect to the content recorded on the disk such as a Blu-ray Disc (registered trademark).

(a) Usage rule with respect to content copied on a disk such as a Blu-ray Disc (registered trademark) from a medium (e.g., ROM disk) on which the content has already been recorded, and (b) Usage rule with respect to content recorded on a disk such as a Blu-ray Disc (registered trademark) after download from a server.

In the AACS, for example, when content copy between the media in (a) above is executed, there is a rule regarding MC (managed copy) making it a condition that copy allowance information is acquired from a management server.

Further, for download processing of content from the server in (b) above, in the AACS, also when various download modes such as EST (electric sell through) using a user apparatus such as a PC, and MoD (manufacturing on demand) using a shared terminal placed in a convenience store or the like are defined and such download processing is performed so that content is recorded on a disk and used, processing based on a predetermined rule is set to be obligatory.

It should be noted that the above-mentioned processing is described in, for example, Japanese Patent Application Laid-open No. 2008-98765.

However, as described above, in the AACS rules, content recorded on a disk such as a Blu-ray Disc (registered trademark) is assumed as a usage control target. There is a problem in that no sufficient rules regarding a usage control with respect to content recorded on, for example, a flash memory type memory card including a USB memory and the like exist.

SUMMARY

In view of the problem above, there is a need for an information processing apparatus, an information processing method, and a program that realize a configuration for preventing unauthorized use of content by establishing a usage control configuration when content is recorded on an information recording medium other than a disk, such as a flash memory, and used.

According to a first embodiment of the present disclosure, there is provided an information processing apparatus, including a storage that is divided into a protected area to which access is limited and a general purpose area which is freely accessible, the storage being configured to store in the general purpose area
encrypted content, and
an encrypted title key obtained by encrypting a title key to be applied to decrypt the encrypted content, and
store in the protected area
a binding key applied to encrypt the title key, and
a hash value of the encrypted title key; and
a data processor configured to determine, in response to a request for access to the protected area from an external apparatus, whether or not to permit the access, and permit, only when access permission determination is made, the access to the protected area.

In addition, the information processing apparatus according to the embodiment of the present disclosure further includes a memory card, in which the memory card is loaded into a reproduction apparatus, and the reproduction apparatus with the memory card being loaded thereto is allowed to determine whether or not to permit reproduction of the encrypted content based on a result of matching between the hash value stored in the protected area and a hash value calculated based on the encrypted title key.

In addition, in the information processing apparatus according to the embodiment of the present disclosure, the data processor determines, based on information recorded in a server certificate provided by a server configured to provide the encrypted content, whether or not to permit access to the protected area by the server, and stores in the protected area the hash value of the encrypted title key that is provided by the server.

In addition, in the information processing apparatus according to the embodiment of the present disclosure, the server certificate includes a public key certificate in which a public key of the server is stored, the server certificate further including a certificate in which access permission information in units of a division area of the protected area is recorded.

In addition, according to a second embodiment of the present disclosure, there is provided an information processing apparatus, including a data processor configured to execute content reproduction processing, the data processor being further configured to execute authentication processing on a memory card in which reproduction target content is stored, read out, from the memory card on which the authentication processing succeeds, an encrypted title key being data obtained by encrypting a title key applied to encrypt the encrypted content, and calculate a hash value of the encrypted title key, and execute matching between the calculated hash value and a hash value for matching that is acquired from the memory card, and determine, based on a result of the matching, whether or not to permit reproduction of the content.

In addition, in the information processing apparatus according to the embodiment of the present disclosure, the memory card is divided into a protected area to which access is limited and a general purpose area which is freely accessible, and the data processor reads out from the general purpose area the encrypted title key, and from the protected area the hash value for matching.

In addition, in the information processing apparatus according to the embodiment of the present disclosure, in the authentication processing on the memory card, the data processor outputs to the memory card a certificate in which access permission information with respect to the protected area is recorded.

In addition, according to a third embodiment of the present disclosure, there is provided a server apparatus configured to execute content provision processing with respect to a memory card, the server apparatus including a data processor configured to generate encrypted content encrypted with a title key, a binding key being an encryption key for the title key, an encrypted title key obtained by encrypting the title key with the binding key, and a hash value of the encrypted title key, output the generated encrypted content, binding key, encrypted title key, and hash value to the memory card to be recorded in the memory card, and output a request for access to a protected area being an access-limited storage area within the memory card to record the hash value in the protected area based on access permission by the memory card in response to the request for access.

In addition, the server apparatus according to the embodiment of the present disclosure is configured to hold a server certificate in which access permission information with respect to the protected area of the memory card is recorded, and provide the server certificate to the memory card to cause the memory card to determine whether or not to permit the access.

In addition, according to a fourth embodiment of the present disclosure, there is provided an information processing system, including:

a content providing server configured to generate encrypted content encrypted with a title key, a binding key being an encryption key for the title key, an encrypted title key obtained by encrypting the title key with the binding key, and a hash value of the encrypted title key; and a memory card configured to store content provided by the content providing server, the memory card including a storage divided into a protected area to which access is limited and a general purpose area which is freely accessible, the memory card being further configured to store in the general purpose area the encrypted content and the encrypted title key, store in the protected area the binding key and the hash value of the encrypted title key, and verify, in response to a request for access to the protected area from the content providing server, a certificate provided by the content providing server, and determine whether or not to permit the access, the content providing server being further configured to output the generated encrypted content, binding key, encrypted title key, and hash value to the memory card.

In addition, in the information processing system according to the embodiment of the present disclosure, the content providing server holds a server certificate in which access permission information with respect to the protected area of the memory card is recorded, and provides the server certificate to the memory card to cause the memory card to determine whether or not to permit the access.

In addition, according to a fifth embodiment of the present disclosure, there is provided an information processing method for an information processing apparatus including a data processor and a storage that is divided into a protected area to which access is limited and a general purpose area which is freely accessible, the method including by the data processor:

executing access permission determination processing, in which, in response to a request for access to the protected area from an external apparatus, whether or not to permit the access is determined and the access to the protected area is permitted only when access permission determination is made; and storing, when the access permission determination is made in the access permission determination processing, in the general purpose area encrypted content, and an encrypted title key obtained by encrypting the title key to be applied to decrypt the encrypted content, the encrypted content and the encrypted title key being data provided by the external apparatus, and in the access protected area a binding key applied to encrypt the title key, and a hash value of the encrypted title key, the binding key and the hash value being data provided by the external apparatus.

In addition, according to a sixth embodiment of the present disclosure, there is provided an information processing method of executing content reproduction processing in an information processing apparatus, the method including by a data processor of the information processing apparatus:

performing authentication processing on a memory card in which reproduction target content is stored;

reading out, from the memory card on which the authentication processing succeeds, an encrypted title key being data obtained by encrypting a title key applied to encrypt encrypted content, and calculating a hash value of the encrypted title key; and executing matching between the calculated hash value and a hash value for matching that is acquired from the memory card, and determining, based on a result of the matching, whether or not to permit reproduction of the content.

In addition, according to a seventh embodiment of the present disclosure, there is provided an information processing method for a server apparatus configured to execute content provision processing with respect to a memory card, the method including by a data processor of the server apparatus:

generating
encrypted content encrypted with a title key,
a binding key being an encryption key for the title key,
an encrypted title key obtained by encrypting the title key with the binding key, and
a hash value of the encrypted title key,
outputting the generated encrypted content, binding key, encrypted title key, and hash value to the memory card to be recorded in the memory card, and
outputting a request for access to a protected area being an access-limited storage area within the memory card to record the hash value in the protected area based on access permission by the memory card in response to the request for access.

In addition, according to an eighth embodiment of the present disclosure, there is provided a program for executing information processing in an information processing apparatus including a data processor and a storage that is divided into a protected area to which access is limited and a general purpose area which is freely accessible, the program causing the data processor to:

execute access permission determination processing, in which in response to a request for access to the protected area from the external apparatus, whether or not to permit the access is determined, and the access to the protected area is permitted only when access permission determination is made; and store, when the access permission determination is made in the access permission determination processing,
in the access protected area,
a binding key applied to encrypt the title key, and
a hash value of the encrypted title key, the binding key and the hash value being data provided by the external apparatus, and
in the general purpose area,
encrypted content, and
an encrypted title key obtained by encrypting the title key to be applied to decrypt the encrypted content, the encrypted content and the encrypted title key being data provided by the external apparatus.

In addition, according to a ninth embodiment of the present disclosure, there is provided a program for executing content reproduction processing in an information processing apparatus, the program causing a data processor of the information processing apparatus to:

execute authentication processing on a memory card in which reproduction target content is stored;

read out, from a memory card on which the authentication processing succeeds, an encrypted title key being data obtained by encrypting a title key applied to encrypt encrypted content, and calculate a hash value of the encrypted title key, and execute matching between the calculated hash value and a hash value for matching that is acquired from the memory card to determine, based on a result of the matching, whether or not to permit reproduction of the content.

In addition, according to a tenth embodiment of the present disclosure, there is provided a program for executing information processing in a server apparatus configured to execute content provision processing with respect to a memory card, the program causing a data processor of the server apparatus to:

generate
encrypted content encrypted with a title key,
a binding key being an encrypted key of the title key,
an encrypted title key obtained by encrypting the title key with the binding key, and
a hash value of the encrypted title key,
output the generated encrypted content, binding key, encrypted title key, and hash value to the memory card to be recorded in the memory card; and
output a request for access to a protected area being an access-limited storage area within the memory card to record the hash value in the protected area based on access permission by the memory card in response to the request for access.

It should be noted that a program according to the embodiment of the present disclosure is a program that can be provided by a storage medium or a communication medium that provided in a computer-readable form to an information processing apparatus or a computer system that is capable of executing various program codes, for example. By providing such a program in a computer-readable form, processing corresponding to the program is realized on the information processing apparatus or the computer system.

These and other objects, features and advantages of the present disclosure will become more apparent in light of the following detailed description of best mode embodiments thereof, as illustrated in the accompanying drawings. It should be noted that the system mentioned herein means a logical collective configuration including a plurality of apparatuses, and the apparatuses having respective configurations are not limited to be within a single casing.

According to configurations of an embodiment of the present disclosure, a configuration for preventing unauthorized use of content due to leak of a key applied to decrypt encrypted content can be realized.

Specifically, for example, in a memory card for storing content provided from a server, a protected area to which access is limited and a general purpose area which is freely accessible are set. The server generates encrypted content encrypted with a title key, a binding key being an encryption key for a title key, an encrypted title key obtained by encrypting the title key with the binding key, and a hash value of the encrypted title key, and outputs them to the memory card. The memory card stores in the general purpose area the encrypted content and the encrypted title key, and in the protected area the binding key and the hash value of the encrypted title key to determine, based on verification of the hash value, whether or not to permit reproduction of the content upon content reproduction.

With these configurations, for example, even if the binding key is leaked, when unauthorized processing such as encrypting the encrypted title key with the leaked binding key is performed, verification of the hash value can detect this unauthorized processing. Thus, it becomes possible to prevent unauthorized use of content.

DETAILED DESCRIPTION OF EMBODIMENTS

Figure 1:
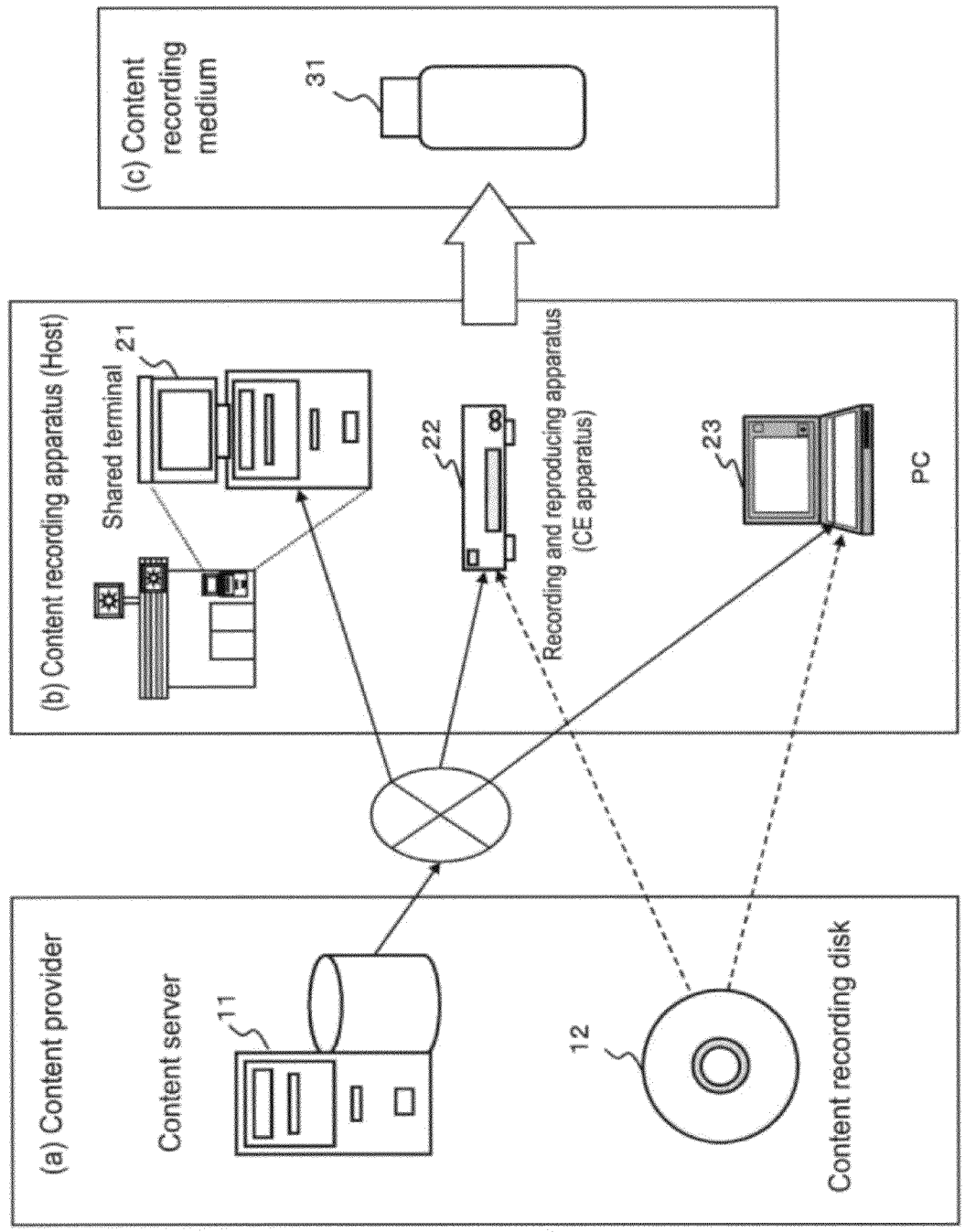
FIG. 1 is a diagram for describing an outline of content provision processing and content use processing.

Hereinafter, the details of an information processing apparatus, an information processing method, and a program according to embodiments of the present disclosure will be described with reference to the drawings. It should be noted that the descriptions will be made in the following order.

1. Outline of content provision processing and content use processing
2. Configuration example and use example of memory card
3. Certificate containing access permission information with respect to protected area
4. Example of access processing on memory card to which certificate of each apparatus is applied
5. Example of write processing of content, key information, etc. in memory card and problems
6. Configuration capable of preventing unauthorized use of content
7. Content reproduction processing
8. Hardware configuration example of each apparatus
9. Summary of configuration according to embodiment of present disclosure

[1. Outline of Content Provision Processing and Content Use Processing]

Hereinafter, the details of the information processing apparatus, the information processing method, and the program according to the present disclosure will be described with reference to the drawings.

First, referring to FIG. 1 and the like, an outline of content provision processing and content use processing will be described.

FIG. 1 shows, from the left,
(a) a content provider,
(b) a content recording apparatus (host), and
(c) a content recording medium.

(c) The content recording medium is a medium in which a user records content, and which is used for content reproduction processing. Here, for example, a memory card 31 being an information recording apparatus such as a flash memory is shown.

For example, the user records and uses various types of content such as music and film on the memory card 31. The content is, for example, content to be a usage control target, such as copyright management content. Only use under a predetermined use condition is permitted, and basically, disordered copy processing, unlimited distribution of copied data, and the like are forbidden. It should be noted that although will be described later, in the case of recording content in the memory card 31, usage control information (usage rule) corresponding to the content, specifically, usage control information (usage rule), in which copy limited information and the like on the number of permitted copying and the like are defined, are also recorded.

(a) The content provider is a provider of content such as music and film, use of which is limited. FIG. 1 shows a content server 11 and a content recording disk 12 such as a ROM disk on which content is recorded in advance.

The content server 11 is a server that provides content such as music and film. The content recording disk 12 is a disk such as a ROM disk on which content such as music and film is recorded in advance.

The user loads the memory card 31 being (c) the content recording medium to (b) the content recording apparatus (host) to connect it to the content server 11 via (b) the content recording apparatus (host). Thus, the user can receive (download) content and record it in the memory card 31.

It should be noted that in this download processing, the content server 11 executes processing according to a predetermined sequence to provide, in addition to encrypted content, content management information including usage control information, a token, key information (binding key), and the like. These processing and provided data will be described later in detail.

Otherwise, the user loads, to (b) the content recording apparatus (host) with the memory card 31 being (c) the content recording medium being loaded thereto, the content recording disk 12 such as a ROM disk on which content is recorded in advance. Thus, the user can copy the content recorded on the content recording disk 12 to the memory card 31. It should be noted that also in the case of executing this copy processing, it is necessary to connect to the content server 11 and to execute processing according to a predetermined sequence. In the content copy processing from a disk, the content server 11 provides content management information including usage control information, a token, key information (binding key), and the like, that correspond to copied content.

(b) The content recording apparatus (host) loads the memory card 31 being (c) the content recording medium, and records on the memory card 31 content received (downloaded) from the content server 11 being (a) the content provider via a network, or content read from the content recording disk 12.

As (b) the content recording apparatus (host), there are a shared terminal 21 placed in a public space that can be used by a large indefinite number of users, for example, a station or a convenience store, a recording and reproducing apparatus (CE (consumer electronic) apparatus) 22 and a PC 23 as user apparatuses, and the like. All the apparatuses are apparatuses capable of loading the memory card 31 being (c) the content recording medium.

Further, (b) the content recording apparatuses (hosts) described above each are configured to be capable of executing data sending/receiving processing via a network when executing download processing from the content server 11.

In the case of using the content recording disk 12, it needs to be an apparatus capable of reproducing a disk.

As shown in FIG. 1, the user records content downloaded from the content server 11 being (a) the content provider or content recorded on the content recording disk 12 such as a ROM disk via (b) the content recording apparatus (host), in the memory card 31 being (c) the content recording medium.

A use mode of the content recorded in the memory card 31 will be described with reference to FIG. 2.

The user loads the memory card 31, in which the content is recorded, to, for example, the recording and reproducing apparatus (CE apparatus) 22, the PC 23, or the like being the user apparatus as (b) the content recording apparatus (host) described with reference to (b) in FIG. 1, for reading and reproducing the content recorded in the memory card 31.

It should be noted that in many cases, such content is recorded as encrypted content, the reproduction apparatus such as the recording and reproducing apparatus (CE apparatus) 22 or the PC 23 reproduces the content after executing decryption processing according to a predetermined sequence.

It should be noted that an apparatus that reproduces the content recorded in the memory card 31 is not limited to (b) the content recording apparatus (host) described with reference to (b) in FIG. 1, and may be other reproduction apparatuses (players). It should be noted that it needs to be an apparatus capable of, for example, executing decryption processing and the like of the encrypted content according to a predetermined sequence, i.e., an apparatus storing a program for executing a predetermined reproduction sequence. It should be noted that the details of the content reproduction sequence will be described later.

[2. Configuration Example and Use Example of Memory Card]

Next, a configuration example and a use example of a memory card such as a flash memory that is used as a content recording medium will be described.

Figure 3:
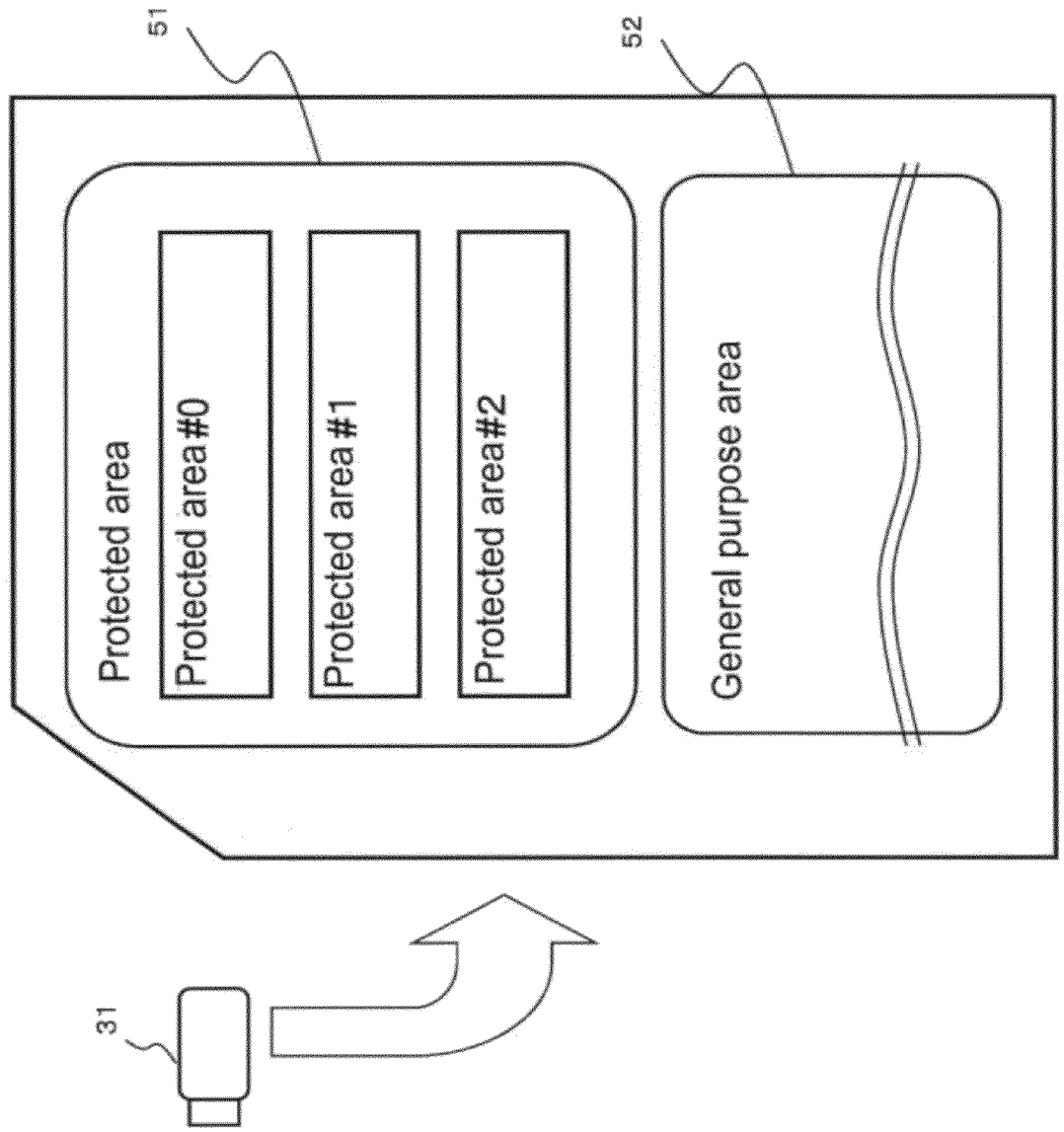
FIG. 3 is a diagram for describing a specific configuration example of a storage area of the memory card.

A specific configuration example of a storage area of the memory card 31 is shown in FIG. 3.

The storage area of the memory card 31 is, as shown in FIG. 3, constituted of (a) a protected area 51, and
(b) a general purpose area 52.

(b) The general purpose area 52 is an area to which a recording and reproducing apparatus used by the user can freely access. In (b) the general purpose area 52, content, generally-used content management data, and the like are recorded. It is an area which the user can freely write and read data in/from.

On the other hand, (a) the protected area 51 is an area to which the user is not permitted to freely access.

For example, when writing or reading data by the recording and reproducing apparatus or a reproduction apparatus that is used by the user, the server connected via a network, or the like, a data processor of the memory card 31 determines whether or not to permit each apparatus to execute reading or writing according to a program stored in advance in the memory card 31.

The memory card 31 includes the data processor for executing the program stored in advance, and an authentication processor that executes authentication processing. The memory card 31 first executes authentication processing on an apparatus that tries to write or read data in/from the memory card 31.

In this authentication processing phase, from an apparatus of interest, i.e., an access request apparatus, an apparatus certificate (e.g., server certificate) such as a public key certificate is received. Using information described in the certificate, whether or not to permit access to each division area of the protected area 51 is determined. Regarding this determination processing, determination processing is performed in units of the division area (area #0, #1, #2 . . . shown in the figure) in the protected area 51 shown in FIG. 3. Then, only processing (data read/write processing, etc.) permitted in a permitted division area(s) is executed.

This read/write limited information (PAD read/PAD write) from/in a medium is set, for example, for each apparatus that tries to access, for example, the content server or the recording and reproducing apparatus (host). This information is recorded in a server certificate or a host certificate corresponding to each apparatus.

The memory card 31 verifies, according to a defined program stored in advance in the memory card 31, data recorded in the server certificate or the host certificate. Then, the memory card 31 performs processing of permitting access only to the area(s) to which access permission is made.

[3. Certificate Containing Access Permission Information with Respect to Protected Area]

Next, a configuration example of a certificate that needs to be presented to the memory card upon access to the protected area 51 of the memory card 31 described above will be described with reference to FIG. 4.

As mentioned above, the memory card 31 performs authentication processing on an apparatus that tries to write or read data in/from the memory card 31. In this authentication processing phase, from an apparatus of interest, i.e., an access request apparatus, an apparatus certificate (e.g., server certificate) such as a public key certificate is received. Using information described in the certificate, whether or not to permit access to each division area of the protected area 51 is determined.

A configuration example of the server certificate to be provided to the server will be described with reference to FIG. 4 as an example of the apparatus certificate to be used for this authentication processing.

The server certificate is provided by, for example, an authentication station being a subject that issues a public key certificate, to, for example, each server such as a content server that provides content. For example, the server certificate is a certificate of the server that is issued to the server that permitted by the authentication station to execute content provision processing. Further, it is a certificate in which the server public key and the like are stored. With respect to the server certificate, a signature is set with an authentication station secret key, so that it is configured as tamper-proof data.

Figure 4:
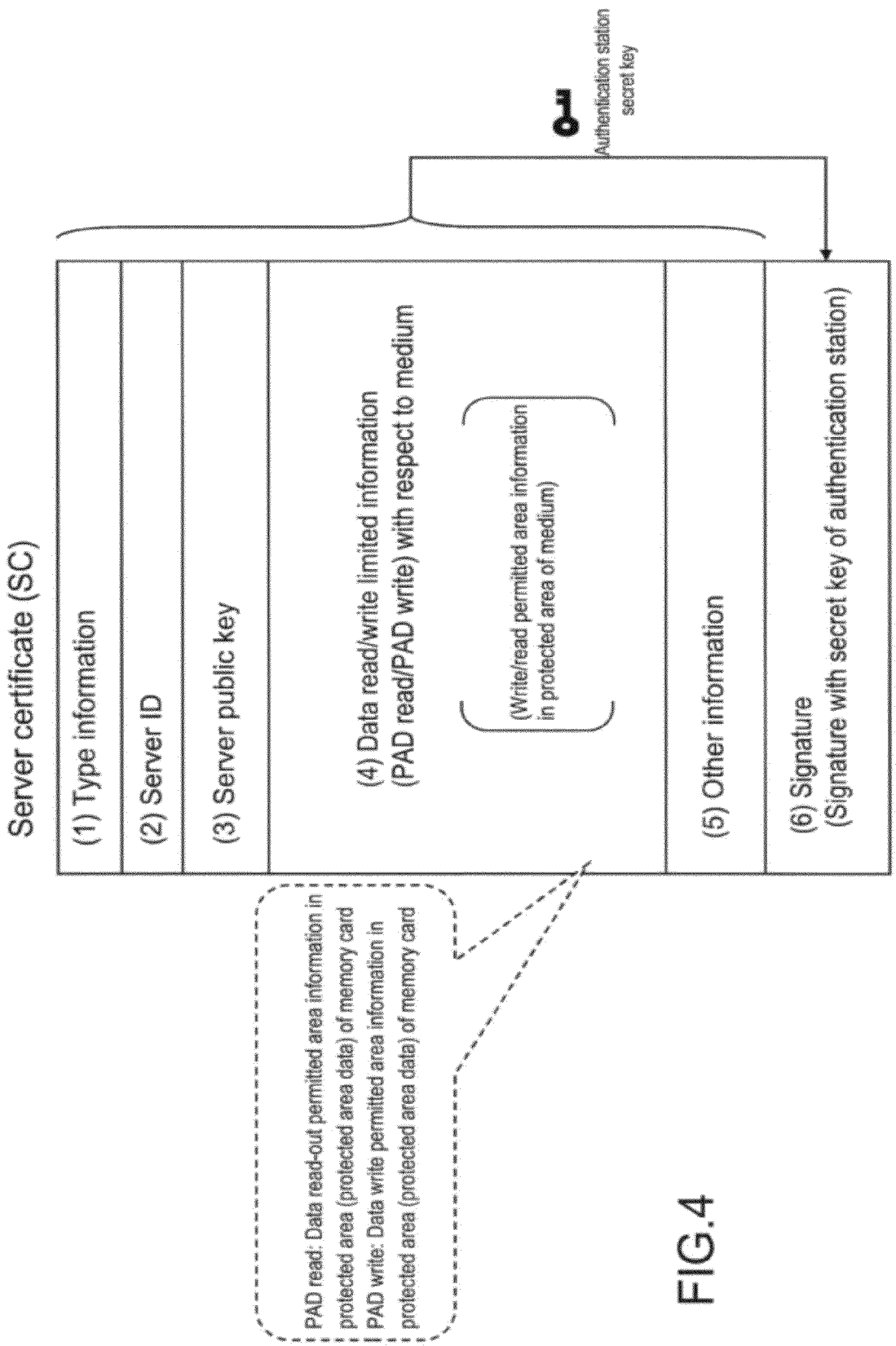
FIG. 4 is a diagram for describing a server certificate.

FIG. 4 shows a specific example of the server certificate provided by the authentication station to each content server.

The server certificate contains, as shown in FIG. 4, the following data.

(1) Type information
(2) Server ID (3) Server public key
(4) Read/write limited information from/in medium (PAD read/PAD write)
(5) Other information
(6) Signature Hereinafter, the data (1) to (6) above will be described.

(1) Type Information

The type information is information indicating a certificate type or a content server type. For example, data indicating that the certificate of interest is a server certificate and information indicating a server type or the like are recorded as the type information. Here, as a server type, for example, whether a server provides music content or film content is indicated (2) Server ID The server ID is an area in which a server ID as server identification information is recorded.

(3) Server Public Key

The server public key is a public key of the server. The server public key constitutes a key pair together with a server secret key provided to the server, the key pair being based on a public key encryption method.

(4) Read/Write Limited Information from/in Medium (PAD Read/PAD Write)

Figure 2:
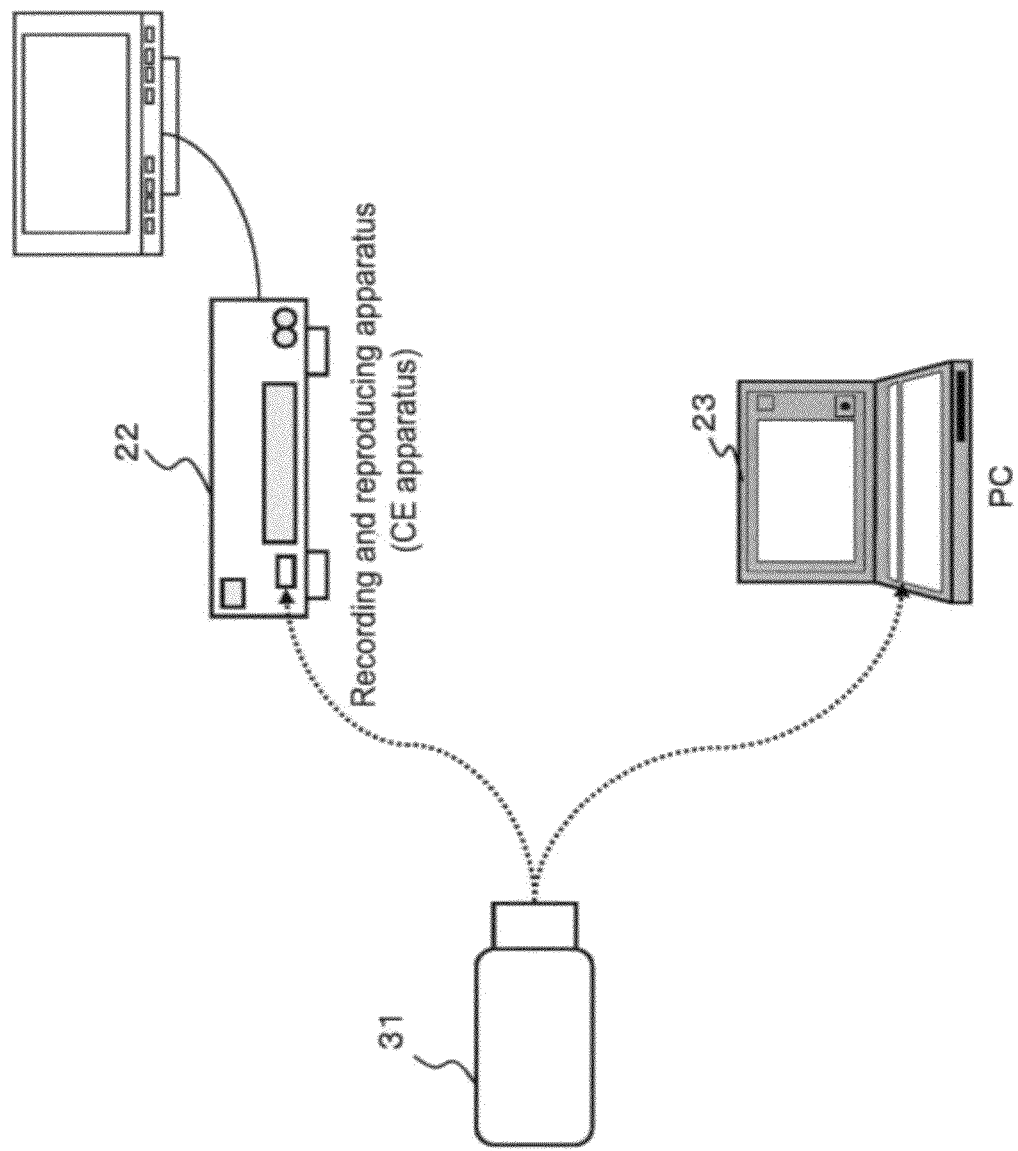
FIG. 2 is a diagram for describing a use mode of content recorded on a memory card.

As the read/write limited information from/in a medium (PAD read/PAD write), information on a division area(s) in the protected area (PDA), to which reading or writing of data is permitted, the protected area being set in the storage area of the medium in which the content is recorded, for example, the memory card 31 shown in FIGS. 1 and 2 or the memory card 31 shown in FIG. 3.

(5) Other Information,
(6) Signature

In the server certificate, various types of information are recorded in addition to (1) to (4) above. That is, signature data with respect to the information (1) to (5) is also recorded.

The signature is executed with a secret key of the authentication station. In order to retrieve and use the information recorded in the server certificate, for example, the server public key, signature verification processing applying the public key of the authentication station is first executed to verify that the server certificate is not falsified. Then, by making it a condition that this verification is performed, use of the data stored in the certificate such as the server public key is permitted.

[4. Example of Access Processing on Memory Card to Which Certificate of Each Apparatus is Applied]

As described with reference to FIG. 4, upon access to the protected area 51 of the memory card 31, it is necessary to present the certificate as shown in FIG. 4 to the memory card.

The memory card checks the certificate shown in FIG. 4 to determine whether or not to permit access to the protected area 51 of the memory card 31 shown in FIG. 3.

The server holds the server certificate described with reference to FIG. 4, for example. The host apparatus such as the recording and reproducing apparatus that, for example, reproduces the content holds the certificate (host certificate) corresponding to the host apparatus.

When accessing the protected area of the memory card, each of these apparatuses needs to provide the certificate to the memory card so that whether or not to permit access is determined based on verification on a memory card side.

Figure 5:
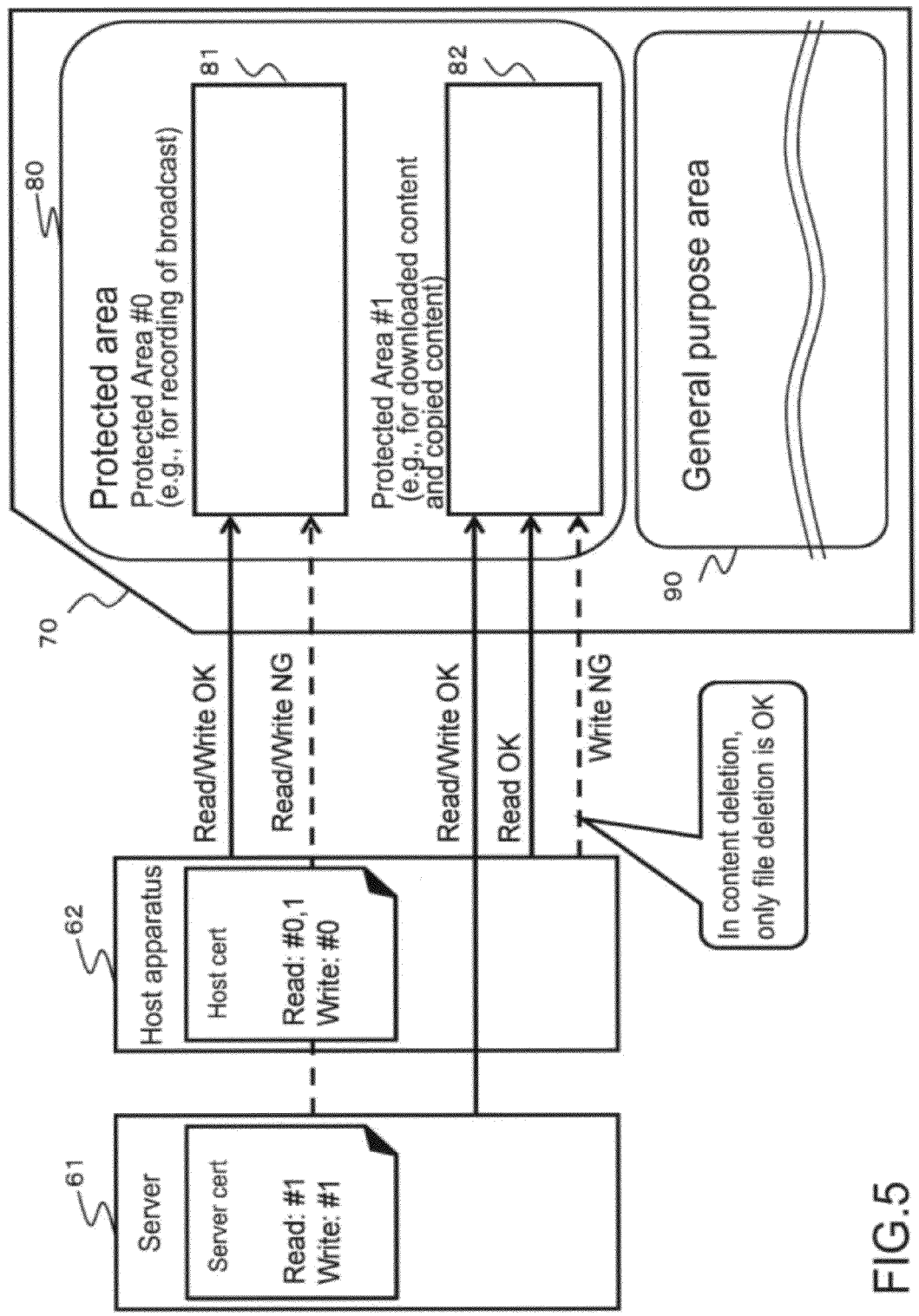
FIG. 5 is a diagram for describing a specific configuration example of the storage area of the memory card and an example of access control processing.

Referring to FIG. 5, setting examples of access limitation when the apparatus that requests access to the memory card is the server and when the apparatus that requests access to the memory card is the host apparatus such as the recording and reproducing apparatus will be described.

FIG. 5 shows, from the left, a server 61, a host apparatus 62, and a memory card 70. Here, the server 61 and the host apparatus 62 are apparatuses that request accesses to the memory card.

The server 61 is a server that writes key information (binding key, etc.), which becomes necessary in reproduction of, for example, content recorded in the memory card 70 such as downloaded content or copied content from a disk, in a protected area 80 of the memory card 70.

The host apparatus 62 is an apparatus that reproduces content stored in the memory card 70. Further, it is an apparatus that needs to acquire a binding key recorded in the memory card 70 for content decryption processing.

The memory card 70 includes the protected area 80 and a general purpose area 90. The encrypted content and the like are recorded in the general purpose area 90.

The binding key being a key necessary for content reproduction is recorded in the protected area 80.

As described above with reference to FIG. 3, the protected area 80 is divided into a plurality of areas.

In the example shown in FIG. 5, the protected area 80 includes the following two division areas:
a division area #0 (protected area #0) 81, and
a division area #1 (protected area #1) 82.

As a setting mode of these division areas, various settings are possible.

In the example shown in FIG. 5, as one example, the division area #0 (protected area #0) 81 is set to be a binding key recording area for key data of broadcast content, and the division area #1 (protected area #1) 82 is set to be a binding key recording area for key data of downloaded or copied content.

In such setting, for example, a server that provides downloaded content records the binding key necessary for decrypting the provided content in the division area #1 (protected area #1) 82.

In this case, write permitted area information
(PAD write) recorded in the server certificate of the server 61 is configured as a certificate in which write permission with respect to division area #1 (protected area #1) is set.

It should be noted that in the example shown in the figure, it is set that with respect to the division area to which writing is permitted, reading is also permitted.

On the other hand, the host certificate held by the host apparatus 62 being a reproduction apparatus that reads the binding key recorded in the division area #1 (protected area #1) 82 and executes content reproduction is configured as a certificate in which only read permission with respect to the division area #1 (protected area #1) is set.

In the host certificate, write permission with respect to the division area #1 (protected area #1) is not set.

It should be noted that for the purpose of making such a setting that upon content deletion, a binding key corresponding to the deleted content can be also deleted, it may be set that deletion processing is permitted.

That is, it may be set that the data processor of the memory card determines whether or not to permit the access request apparatus to execute data writing and data reading in/from the protected area 80 in accordance with an apparatus certificate of each apparatus, but all deletion requests are permitted.

Alternatively, the following configuration may be employed. Specifically, in this configuration, in addition to permission information on each processing of writing and reading in units of the division area, deletion permission information may be recorded in the certificate of the access request apparatus. Then, based on the recorded information, whether or not to permit the deletion may be determined.

The division area #0 (protected area #0) 81 of the memory card 70 shown in FIG. 5 is set as a binding key recording area for the key data of the broadcast content.

Regarding the broadcast content, for example, the host apparatus 62 having a function of receiving/recording broadcast data, such as a recorder or a PC, receives content from a broadcast station and records it in a medium.

In this case, the binding key being key information applied to decrypt the broadcast content is provided by the broadcast station to the host apparatus 62. The host apparatus 62 accesses the memory card 70, and records key data for the broadcast content in the protected area 80 of the memory card 70.

In this example, an area in which the key data for the broadcast content is recorded is defined in advance as the division area #0 (protected area #0) 81.

Regarding the protected area 80 of the memory card 70, the type of data to be recorded can be defined in advance in units of the division area (#0, #1, #2 . . . ).

The memory card determines, in accordance with an input of a data write request or a data read request from the access request apparatus, a type of data requested to be written or read, and selects the division area (#0, #1, #2 . . . ) as a data write destination or a data read destination.

Regarding the binding key being key information to be applied to decrypt the broadcast content, the host apparatus 62 executes write processing, and executes read processing also in reproduction processing.

Therefore, the host certificate held by the host apparatus 62 is configured as a certificate in which regarding the division area #0 (protected area #0) 81 defined as the storage area of the key data for the broadcast content, both write permission and read permission are set.

The host certificate held by the host apparatus 62 shown in FIG. 5 is a certificate in which the following setting is made, as shown in the figure, read permitted area: #0, #1, and
write permitted area: #0.

On the other hand, the server 61 is not permitted to perform either of data writing and data reading with respect to the division area #0 (protected area #0) 81 defined as the storage area of the key data for the broadcast content. In the server certificate, non-permission information regarding data writing and data reading is recorded.

The server certificate held by the server 61 shown in FIG. 5 is a certificate in which the following setting is made, as shown in the figure, read permitted area: #1, and
write permitted area: #1.

As mentioned above, regarding the protected area of the memory card, in units of the access request apparatus and in units of the division area (#0, #1, #2 . . . ), permission/non-permission regarding data writing and data reading is set as access control information.

The access control information is recorded in the certificate (server certificate, host certificate, or the like) of each access request apparatus. The memory card first performs signature verification on the certificate received from the access request apparatus and verifies its validity, and then reads the access control information described in the certificate, i.e., the following information, read permitted area information (PAD read), and
write permitted area information (PAD write).

Based on the information above, only processing that the access request apparatus is permitted to perform is permitted and performed.

It should be noted that as the host apparatus, there are also, for example, various types of apparatuses including a CE apparatus such as a recorder and a player, a PC, and the like.

The apparatus certificate is a certificate held by each of these apparatuses. The apparatus certificate can be differently set depending on types of these apparatuses.

Further, the data processor of the memory card may determine whether or not to permit access in units of the division area of the protected area based on not only the following information recorded in the apparatus certificate, i.e., read permitted area information (PAD read), and
write permitted area information (PAD write), but also, for example, the type information (type) included in the certificate described above with reference to FIG. 4.

[5. Example of Write Processing of Content, Key Information, etc. in Memory Card and Problems]

Next, referring to FIG. 6, a write processing example of the content, the key information, and the like on the memory card and problems will be described.

Figure 6:
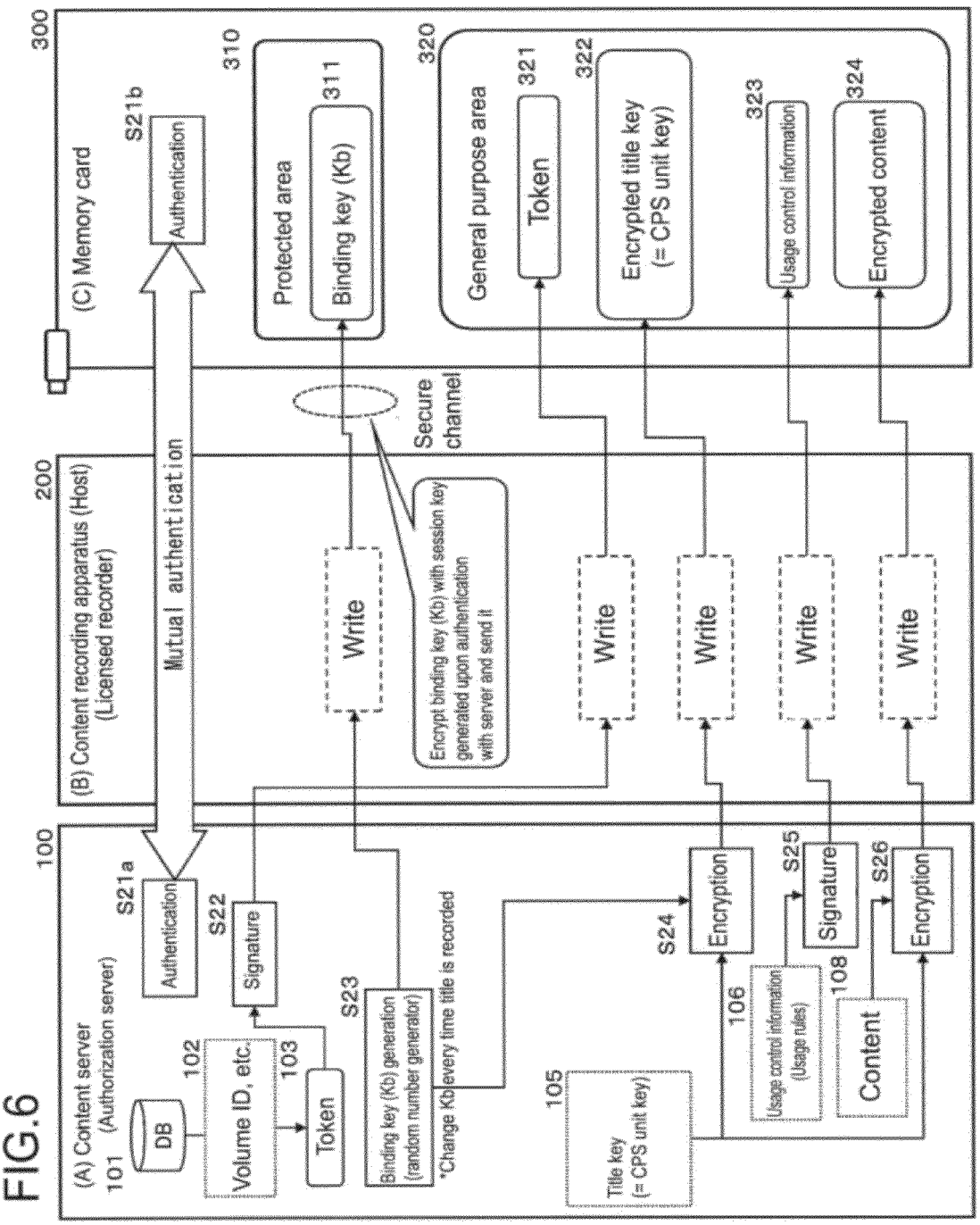
FIG. 6 is a diagram for describing a processing sequence when content provided from a content server is recorded in the memory card.
Figure 8:
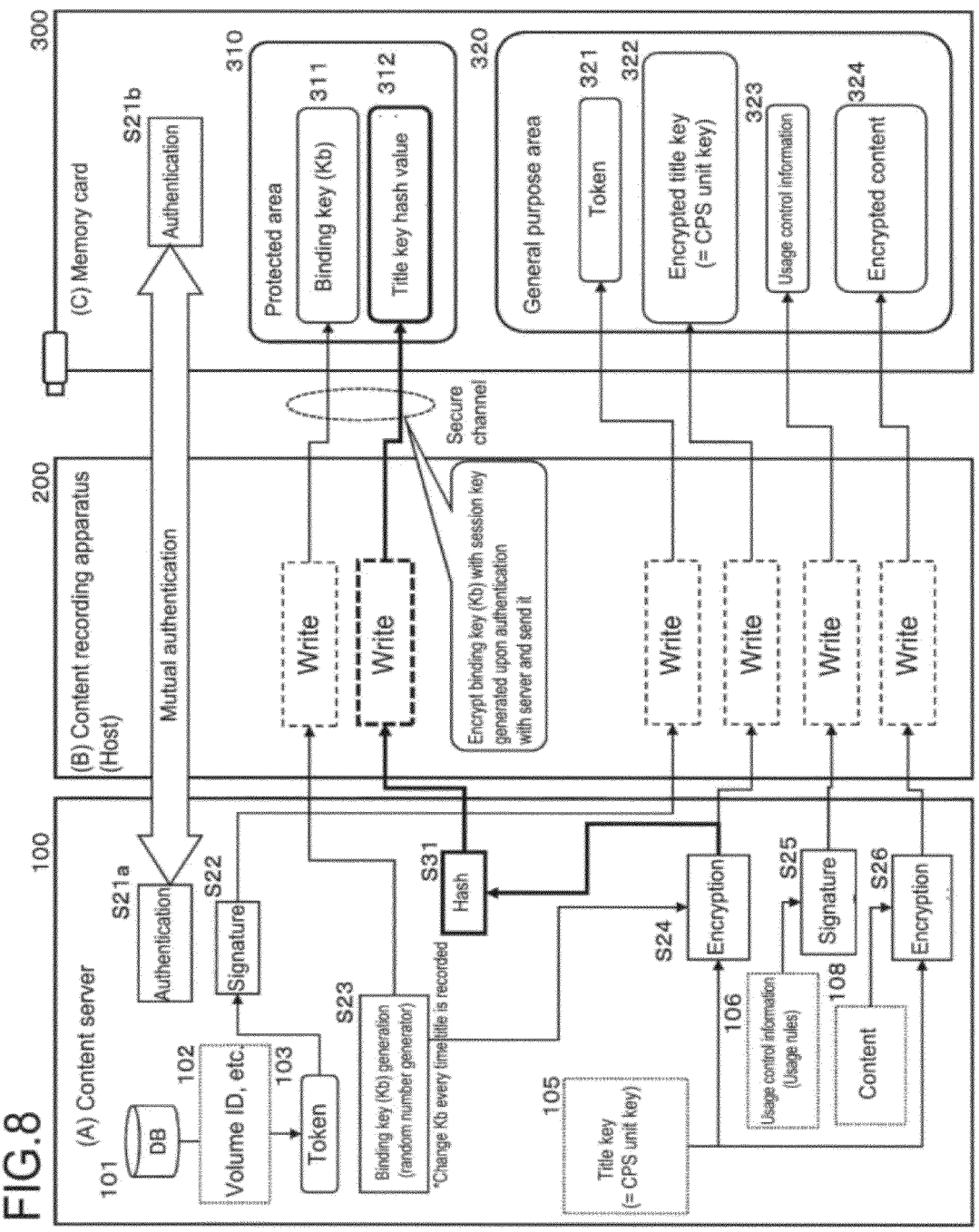
FIG. 8 is a diagram for describing a processing sequence when the content provided from the content server is recorded in the memory card.

It should be noted that the processing example which will be described with reference to FIG. 6 is a processing example having problems, which makes elimination of unauthorized use of content difficult. A processing example according to the present disclosure, which will be described later with respect to FIG. 8, is configured to solve these problems.

First, referring to FIG. 6, a processing sequence having the problems will be described.

FIG. 6 shows, from the left, (A) a content server 100,
(B) a content recording apparatus (host) 200, and
(C) a memory card 300.

(A) The content server 100 is a server that provides content to be recorded on a memory card 300.

(B) The content recording apparatus 200 is an apparatus such as a PC or a recording and reproducing apparatus that loads the memory card 300 and records or reads data on the memory card 300.

(C) The memory card 300 is a storage apparatus (medium) constituted of, for example, a flash memory that records content, key information to be applied upon content reproduction, and the like. Further, it is a storage apparatus that includes the protected area and the general purpose area as described above with reference to FIGS. 3 and 5.

FIG. 6 shows a processing sequence when the content server 100 provides content and content management information other than the content to the memory card 300 and records it therein.

It should be noted that although when the content is copied from the disk 12 shown in FIG. 1 and recorded in the memory card, the content is recorded from the disk to the memory card 300, other management data including the token is sent from the content server 100 to the memory card 300 and recorded therein.

It should be noted that (C) the memory card 300 shown in FIG. 6 is loaded to (B) the content recording apparatus (host) 200, communicates with (A) the content server 100 via a communication unit of (B) the content recording apparatus (host) 200, receives various types of data from (A) the content server 100 via (B) the content recording apparatus (host) 200, and records them.

Referring to FIG. 6, a processing sequence will be described.

First, in Step S21, between the content server 100 and the memory card 300, mutual authentication processing is performed. For example, according to the public key encryption method, mutual authentication processing including exchanging the public key certificates of the both and the like is performed. As described above, the content server 100 holds the server certificate issued by the authentication station, in which the public key is stored, and the secret key. The memory card 300 also receives a pair of the public key certificate and the secret key from the authentication station in advance, and stores them in its own storage.

It should be noted that the memory card 300 includes a data processor. The data processor stores programs for performing mutual authentication processing and determination of whether or not to permit access to the protected area described with reference to FIGS. 3 and 5, and executes these programs.

When mutual authentication between the content server 100 and the memory card 300 succeeds and validities of the both are verified, the server 100 provides the memory card 300 with various types of data. When the mutual authentication does not succeed, data provision processing from the server 100 is not performed.

After the mutual authentication succeeds, the content server 100 acquires data of a volume ID and the like recorded in a database 101, and generates a token 103. In Step S22, signature is executed on the token, and it is sent to the content recording apparatus (host) 200 as data to be written in the memory card 300.

Figure 7:
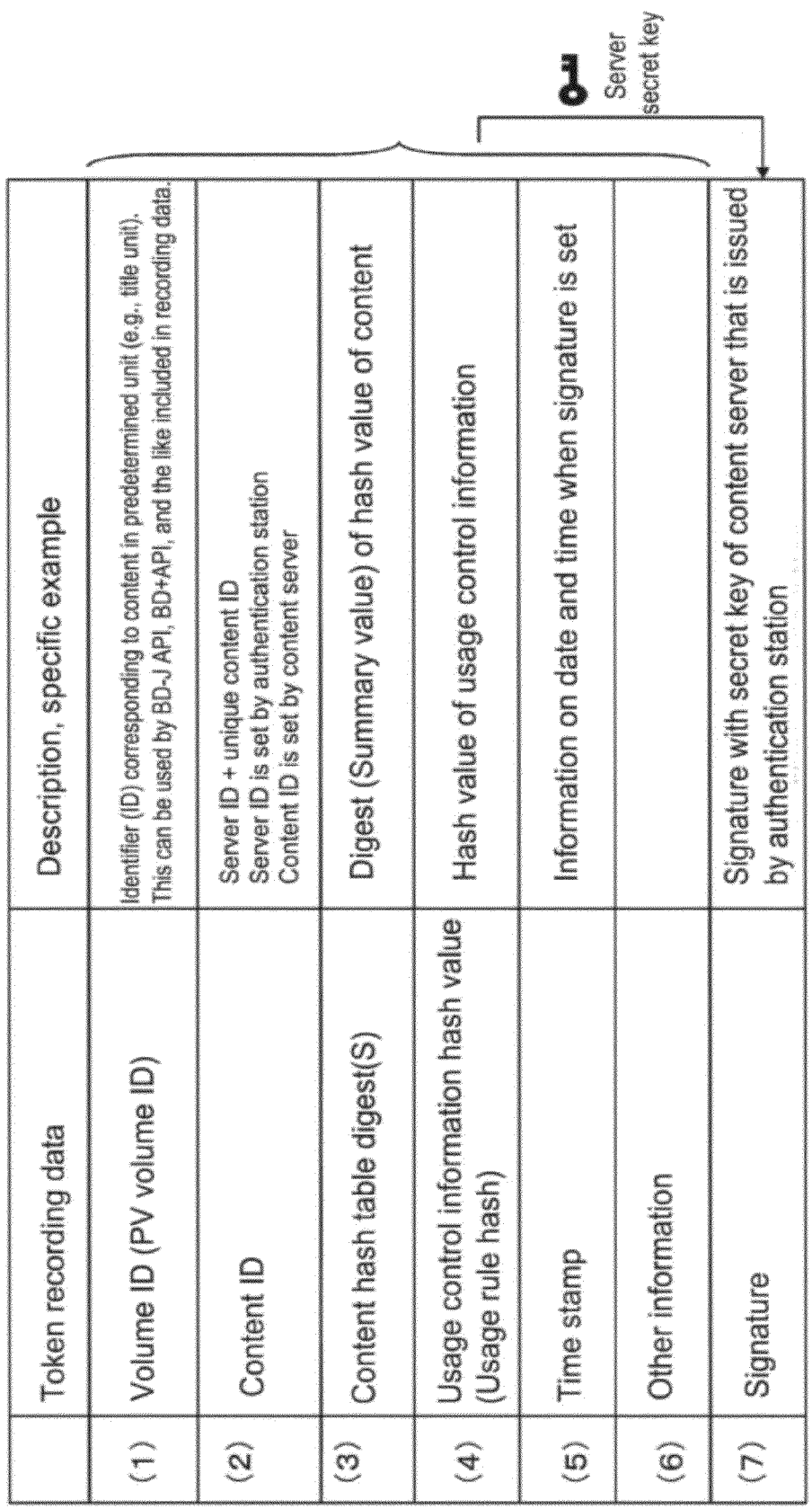
FIG. 7 is a diagram for describing a specific data configuration example of a token generated and provided by the content server.

The token 103 will be described with reference to FIG. 7. As shown in FIG. 7, the token 103 is, for example, data including the following data.

(1) Volume ID (PV volume ID)
(2) Content ID (3) Content hash table digest (S)
(4) Usage control information hash value (usage rule hash)
(5) Time stamp
(6) Other information
(7) Signature Hereinafter, each data above will be described.

(1) Volume ID (PV volume ID)

The volume ID (PV volume ID) is an identifier (ID) corresponding to content in a predetermined unit (e.g., title unit). This ID is, for example, data to which BD-J/API, BD+API, and the like being Java (registered trademark) applications that can be used upon content reproduction can refer.

(2) Content ID

The Content ID is an identifier that identifies content, but a content ID to be recorded in the token is set as data including an ID of a server that has provided the content or the content management data (including token). That is, the content ID is recorded as data including the server ID as follows:

content ID=server ID+unique content ID.

The server ID is an ID set by the authentication station to each content server. It is the same ID as the server ID recorded in the server certificate described above with reference to FIG. 4.

The unique content ID is an identifier (ID) corresponding to the content, which is the content server uniquely sets.

The content ID recorded in the token is, as described above, configured as a combination of the server ID set by the authentication station and the unique content ID set by the content server.

The number of bits constituting the content ID, the number of bits of the server ID, and the number of bits of the unique content ID are defined in advance. The reproduction apparatus that reproduces content can acquire the server ID by acquiring a predetermined number of upper bits from the content ID recorded in the token, and the unique content ID by acquiring a predetermined number of lower bits from the content ID.

(3) Content Hash Table Digest (S)

The content hash table digest (S) is data in which a hash value of the content to be stored on the memory card is recorded. This data is used for content falsification verification processing.

The reproduction apparatus that reproduces content calculates the hash value of the content to be reproduced, which is recorded in the memory card. The reproduction apparatus compares it with a value recorded in the content hash table digest (S) recorded in the token. If the calculated data and the registered data match, it is determined that the content is not falsified and content reproduction is allowed. If the calculated data and the registered data do not match, it is determined that the content may be falsified and reproduction is forbidden.

(4) Usage Control Information Hash Value (Usage Rule Hash)

The usage control information hash value (usage rule hash) is a hash value of the usage control information that is provided by the server to the user as content management data and recorded in the memory card.

The usage control information is, for example, data in which permission information regarding a content use mode or the like is recorded, such as whether or not to permit content copy, the number of copying permitted, whether or not the content can be output to other apparatus, and the like. Further, it is information to be recorded in the memory card together with the content.

The usage control information hash value is a hash value to be used as data for falsification verification of this usage control information.

The reproduction apparatus that reproduces content calculates the hash value of the usage control information corresponding to content to be reproduced, which has been recorded in the memory card, and compares it with a recorded value of the usage control information hash value (usage rule hash) recorded in the token. If the calculated data and the registered data match, it is determined that the usage control information is not falsified and content use according to the usage control information is allowed. If the calculated data and the registered data do not match, it is determined that the usage control information may be falsified and use processing such as content reproduction is forbidden.

(5) Time Stamp

The time stamp is information on date and time when this token is created, for example, date and time when the signature shown in (7) in FIG. 7 is treated.

In the token, in addition to the above-mentioned data, as shown in FIG. 7, [(6) other information] is recorded. In addition, with respect to each of the data (1) to (6), (7) the signature generated with the secret key of the server is recorded. By this signature, a tamper-proof configuration of the token is realized.

In the case of using the token, the signature verification is performed to verify that the token is an appropriate token that is not falsified before used. It should be noted that the signature verification is performed by using the public key of the server. The public key of the server can be acquired from the server certificate described above with reference to FIG. 4.

Referring back to FIG. 6, the description of a recording processing sequence of the content will be continued.

The token including data described with reference to FIG. 7 is sent from (A) the content server 100 to (C) the memory card 300 via (B) the content recording apparatus (host) 200, and recorded in the memory card 300. The recorded data is a token 321 shown in (C) the memory card 300 in FIG. 6.

It should be noted that the memory card 300 is divided into the protected area and the general purpose area as described above with reference to FIGS. 3 and 5.

In a protected area 310 of (C) the memory card 300 shown in FIG. 6, as shown in the figure, a binding key (Kb) 311 is recorded. The other data is recorded in a general purpose area 320.

It should be noted that the binding key (Kb) 311 is a key to be used to encrypt the title key (also referred to as CPS unit key) to be applied to decrypt the encrypted content, and generated by random number generation or the like in the content server.

As shown as processing in Step S23 of (A) the content server 100 in FIG. 6, the binding key (Kb) is generated in the content server. This key is generated by the server performing random number generation or the like and provided to the memory card every time the content is provided to the memory card or the content is copied from the disk. Therefore, a different binding key is generated for each content provision or each content copy.

The binding key (Kb) generated by the server 100 is written in the protected area 310 of the memory card 300.

It should be noted that as described above with reference to FIG. 5, data write processing in the protected area 310 of the memory card 300 or data read processing from the protected area is performed as limited processing that is permitted to be performed by an apparatus having access permission.

In units of the access request apparatus (server or recording and reproducing apparatus (host)) and in units of each division area (#1, #2 . . . ), permission/non-permission regarding writing or reading is set. This setting information is recorded in the server certificate in the case of the server, and in the host certificate in the case of the recording and reproducing apparatus (host).

The memory card 300 refers to a certificate received from the access request apparatus, in this example, the server certificate, and records, in a division area within the protected area, to which writing is permitted, the binding key (Kb). It is the binding key (Kb) 311 shown in FIG. 6. It should be noted that although in FIG. 6, the inside of the protected area 310 is not shown in detail, the protected area 310 is divided into a plurality of division areas (#0, #1, #2 . . . ) as described above with reference to FIG. 3, and the binding key (Kb) 311 is recorded in a division area recorded as a write permitted area in the server certificate.

It should be noted that in authentication processing in Step S21, as the server certificate, a certificate received by the memory card 300 from the content server 100 can be referred to. It should be noted that an assumption is made that the signature of the authentication station is set in the server certificate, the memory card 300 applies the public key of the authentication station to perform the signature verification, and the validity of the server certificate is verified.

It should be noted that the binding key is sent from the content server 100 to the memory card 300 via a secure channel being a secure communication channel as data encrypted with a session key.

The session key is a key that is generated in mutual authentication processing (Step S21) between the server 100 and the memory card 300 and shared by the both. The memory card 300 decrypts the encrypted binding key with the session key, and records it in a predetermined division area of the protected area 310 of the memory card.

Then, (A) the content server 100 shown in FIG. 6 uses the generated binding key (Kb) to encrypt a title key 105 being an encryption key for the content in Step S24 to generate the encrypted title key.

(A) The content server 100 sends the generated encrypted title key to (C) the memory card 300 via (B) the content recording apparatus (host) 200. The memory card 300 records the received encrypted title key on the memory card. This recorded data is an encrypted title key 322 shown in the general purpose area 320 within (C) the memory card 300 in FIG. 6. It should be noted that the title key is also referred to as the CPS unit key.

In addition, the content server 100 generates usage control information 106 corresponding to the content, performs the signature processing with the secret key of the content server 100 in Step S25, and provides it to the memory card 300.

Further, the content server 100 encrypts, in Step S26, content 108 with the title key 105, and provides it to the memory card 300. The content 108 is the reproduction target content displayed on a display or output through a speaker of the reproduction apparatus and viewed and listened to by the user, for example, film.

The memory card 300 records the data provided from the server 100. This recorded data is usage control information 323 and encrypted content 324 shown in (C) the memory card 300 in FIG. 6.

It should be noted that although not shown in the processing sequence shown in FIG. 6, in addition to the above-mentioned data, the content server 100 provides the following data, for example, (1) a content revocation list (CRL), and
(2) a server revocation list (SRL)

to the memory card 300, and this data is recorded in the memory card 300.

The content revocation list (CRL) means a list in which identification information of invalidated content is described, and the server revocation list (SRL) means a list in which identification information of invalidated servers are described.

In the user apparatus, upon content reproduction or content acquisition, these lists are referred to, and whether or not the content to be reproduced is invalidated is checked, and whether or not the server that has acquired the content is invalidated is also checked. When it is invalidated, processing of canceling content reproduction or content acquisition is performed.

Next, problems in the content record sequence described above with reference to FIG. 6 will be described.

In the processing shown in FIG. 6, a binding key 311 being key information applied in decryption processing of the encrypted content 324 recorded in the memory card 300 is stored in the protected area 310 of the memory card 300. Therefore, it appears to be safely stored.

However, this binding key 311 can be read and used from the protected area 310 of the memory card 300 by the reproduction apparatus that performs content reproduction by presenting the certificate of the reproduction apparatus.

Therefore, for example, if the secret key to be applied to the authentication processing on the memory card 300 is leaked and an unauthorized apparatus acquires the leaked data, the unauthorized apparatus can succeed authentication with the memory card and can acquire the binding key 311 from the protected area of the memory card in an unauthorized manner.

As described above, if the binding key is leaked in a certain way, the following unauthorized processing may be performed.

Title keys corresponding to various content are acquired and encrypted using the leaked binding key.

Due to this processing, the following combination of three is completed:

(a) a revealed binding key,
(b) a title key encrypted with the leaked binding key, and
(c) an encrypted content encrypted with a title key.

When the above combination of three is established, the it becomes possible for the reproduction apparatus to decrypt or reproduce the encrypted content in accordance with the following normal content reproduction sequence ((S1) to (S2)) that is defined in advance.

(S1) The encrypted title key encrypted with the leaked binding key is decrypted with the leaked binding key stored in the protected area 310 of the memory card 300 to acquire the title key.

(S2) The acquired title key is used to decrypt or reproduce the encrypted content.

The above-mentioned processing can be executed on various types of content, and by encrypting a title key corresponding to each content with the leaked binding key, the various types of content are more likely used in an unauthorized manner.

That is, for example, the following processing is assumed:
a title key a set correspondingly to content A,
a title key b set correspondingly to content B, and
a title key c set correspondingly to content C . . . .

The title keys corresponding to the various types of content are encrypted by applying the leaked binding key and stored in the general purpose area of the memory card.

By this processing, it becomes possible to decrypt or reproduce any encrypted content A, B, C ... in accordance with the above-mentioned normal content reproduction sequence ((S1) to (S2)).

For example, by providing the leaked binding keys to reproduction apparatuses of users each having a memory card, who are a large indefinite number of clients, this client group can use the content in an unauthorized manner.

It should be noted that in the normal processing sequence, a title key corresponding to each content is encrypted with a unique binding key, which is generated by the server in units of distribution, and provided to a memory card on a client side. However, if an unauthorized reproduction apparatus that reads out a binding key in an unauthorized manner reads out the binding key, decrypts the encrypted title key to acquire a title key, uses the leaked binding key that has been already provided to a large indefinite number of clients to re-encrypt it, and provides it to these clients, it becomes possible to decrypt or reproduce the content in accordance with the above-mentioned normal content reproduction sequence ((S1) to (S2)). As a result, many content will be used in an unauthorized manner.

As mentioned above, it can be assumed that by applying a single binding key as an encryption key for title keys corresponding to various types of content, the title keys are re-encrypted, and, for example, media in each of which the re-encrypted title key and the encrypted content are recorded are diffused in pirated version.

As mentioned above, in the setting shown in FIG. 6, there is a problem in that once the binding key 311 stored in the protected area 310 of the memory card 300 is leaked, the content may be more likely used in an unauthorized manner.

[6. Configuration Capable of Preventing Unauthorized Use of Content]

Next, a configuration capable of preventing unauthorized use of content due to the leaked binding key described above will be described.

A content record sequence in this configuration will be described with reference to FIG. 8.

FIG. 8 shows, as in FIG. 6, from the left, (A) a content server 100, (B) a content recording apparatus (host) 200, and (C) a memory card 300.

(A) The content server 100 is a server that provides content to be recorded in the memory card 300.

(B) The content recording apparatus 200 is an apparatus such as a PC or a recording and reproducing apparatus that loads the memory card 300, and records or reads out data in/from the memory card 300.

(C) The memory card 300 is a storage apparatus (medium) constituted of, for example, a flash memory that records content, key information to be applied upon content reproduction, and the like. Further, it is a storage apparatus that includes the protected area and the general purpose area as described above with reference to FIGS. 3 and 5.

FIG. 8 shows a processing sequence when the content server 100 provides content and content management information other than the content to the memory card 300 and records it therein.

It should be noted that although when the content is copied from the disk 12 shown in FIG. 1 and recorded on the memory card, the content is recorded from the disk to the memory card, other management data including the token is sent from the content server 100 to the memory card 300, and recorded therein.

It should be noted that (C) the memory card 300 shown in FIG. 8 is loaded to (B) the content recording apparatus (host) 200, communicates with (A) the content server 100 via a communication unit of (B) the content recording apparatus (host) 200, and receives various types of data from (A) the content server 100 via (B) the content recording apparatus (host) 200, so that the various types of data are recorded in the memory card 300.

Referring to FIG. 8, a processing sequence will be described.

It should be noted that in FIG. 8, the same data as that in FIG. 6 is denoted by the same reference number, and the same processing is denoted by the same processing number (Sxx).

First, in Step S21, between the content server 100 and the memory card 300, mutual authentication processing is performed. For example, according to the public key encryption method, mutual authentication processing including, for example, exchanging the public key certificates of the both is performed. As described above, the content server 100 holds the server certificate issued by the authentication station, in which the public key is stored, and the secret key. The memory card 300 also receives a pair of the public key certificate and the secret key from the authentication station in advance, and is stored in its own storage.

It should be noted that the memory card 300 includes a data processor that stores programs for performing mutual authentication processing and determination of whether or not to permit access to the protected area described above with reference to FIGS. 3 and 5, and executes these programs.

When mutual authentication between the content server 100 and the memory card 300 succeeds and validities of the both are verified, the server 100 provides the memory card 300 with various types of data. When the mutual authentication does not succeed, data provision processing from the server 100 is not performed.

After the mutual authentication succeeds, the content server 100 acquires data of a volume ID and the like recorded in a database 101, and generates a token 103. In Step S22, signature is executed on the token, and it is sent to the content recording apparatus (host) 200 as data to be written in the memory card 300.

As described above with reference to FIG. 7, the token 103 is, for example, data including the following data.

(1) Volume ID (PV volume ID)

(2) Content ID (3) Content hash table digest (S)

(4) Usage control information hash value (usage rule hash)

(5) Time stamp (6) Other information (7) Signature

Regarding the token, (7) the signature generated with a secret key of the server for each of the data (1) to (6) is recorded. By this signature, a tamper-proof configuration of the token is realized.

In the case of using the token, the signature verification is performed to verify that the token is an appropriate token that is not falsified before used. It should be noted that the signature verification is performed by using the public key of the server. The public key of the server can be acquired from the server certificate described above with reference to FIG. 4.

The token including data described with reference to FIG. 7 is sent from (A) the content server 100 via (B) the content recording apparatus (host) 200 to (C) the memory card 300, and recorded in the memory card 300. The recorded data is a token 321 shown in (C) the memory card 300 in FIG. 8.

It should be noted that the memory card 300 is divided into the protected area and the general purpose area as described above with reference to FIGS. 3 and 5.

In a protected area 310 of (C) the memory card 300 shown in FIG. 8, as shown in the figure, a binding key (Kb) 311 is recorded. The other data is recorded in a general purpose area 320.

It should be noted that the binding key (Kb) 311 is a key to be used to encrypt the title key (also referred to as CPS unit key) to be applied to decrypt the encrypted content, and generated by random number generation or the like in the content server.

As shown as processing in Step S23 of (A) the content server 100 in FIG. 8, the binding key (Kb) is generated in the content server.
This key is generated by the server performing random number generation or the like and provided to the memory card every time the content is provided to the memory card or the content is copied from the disk. Therefore, a different binding key is generated for each content provision or each content copy.

The binding key (Kb) generated by the server 100 is written in the protected area 310 of the memory card 300.

It should be noted that as described above with reference to FIGS. 3 and 5, data write processing in the protected area 310 of the memory card 300 or data read processing from the protected area is performed as limited processing that is permitted to be performed by an apparatus having access permission.

In units of the access request apparatus (server or recording and reproducing apparatus (host)) and in units of each division area (#1, #2 . . . ), permission/non-permission regarding writing or reading is set in the protected area 310 of the memory card 300. This setting information is recorded in the server certificate in the case of the server, and in the host certificate in the case of the recording and reproducing apparatus (host).

The memory card 300 refers to a certificate received from the access request apparatus, in this example, the server certificate, and records, in a division area within the protected area, to which writing is permitted, the binding key (Kb). It is the binding key (Kb) 311 shown in FIG. 8. It should be noted that although in FIG. 8, the inside of the protected area 310 is not shown in detail, the protected area 310 is divided into a plurality of division areas (#0, #1, #2 . . . ) as described above with reference to FIG. 3, and the binding key (Kb) 311 is recorded in a division area recorded as a write permitted area in the server certificate.

It should be noted that in authentication processing in Step S21, as the server certificate, a certificate received by the memory card 300 from the content server 100 can be referred to. It should be noted that an assumption is made that the signature of the authentication station is set in the server certificate, the memory card 300 applies the public key of the authentication station to perform the signature verification, and the validity of the server certificate is verified.

It should be noted that the binding key is sent from the content server 100 to the memory card 300 via a secure channel being a secure communication channel as data encrypted with a session key.

The session key is a key that is generated in mutual authentication processing (Step S21) between the server 100 and the memory card 300 and shared by the both. The memory card 300 decrypts the encrypted binding key with the session key, and records it in a predetermined division area of the protected area 310 of the memory card.

Then, (A) the content server 100 shown in FIG. 8 uses the generated binding key (Kb) to encrypt a title key 105 being an encryption key for the content in Step S24 to generate the encrypted title key.

(A) The content server 100 sends the generated encrypted title key to (C) the memory card 300 via (B) the content recording apparatus (host) 200. The memory card 300 records the received encrypted title key on the memory card. This recorded data is an encrypted title key 322 shown in the general purpose area 320 within (C) the memory card 300 in FIG. 8. It should be noted that the title key is also referred to as the CPS unit key.

In addition, the content server 100 generates usage control information 106 corresponding to the content, performs the signature processing with the secret key of the content server 100 in Step S25, and provides it to the memory card 300.

Further, the content server 100 encrypts, in Step S26, content 108 with the title key 105, and provides it to the memory card 300. The content 108 is the reproduction target content displayed on a display or output through a speaker of the reproduction apparatus and viewed and listened to by the user, for example, film.

The memory card 300 records the data provided from the server 100. This recorded data is usage control information 323 and encrypted content 324 shown in (C) the memory card 300 in FIG. 8.

It should be noted that although not shown in the processing sequence shown in FIG. 8, in addition to the above-mentioned data, the content server 100 provides the following data, for example, (1) a content revocation list (CRL), and
(2) a server revocation list (SRL)

to the memory card 300, and this data is recorded in the memory card 300.

In the processing shown in FIG. 8, processing not shown in FIG. 6 is processing shown in Step S31 in FIG. 8.

The content server 100 calculates a hash value of the encrypted title key generated in Steps S31 and S24.

As a hash algorithm to be applied to the hash value calculation, for example, SHA-1 or a hash function using AES can be applied.

Figure 9:
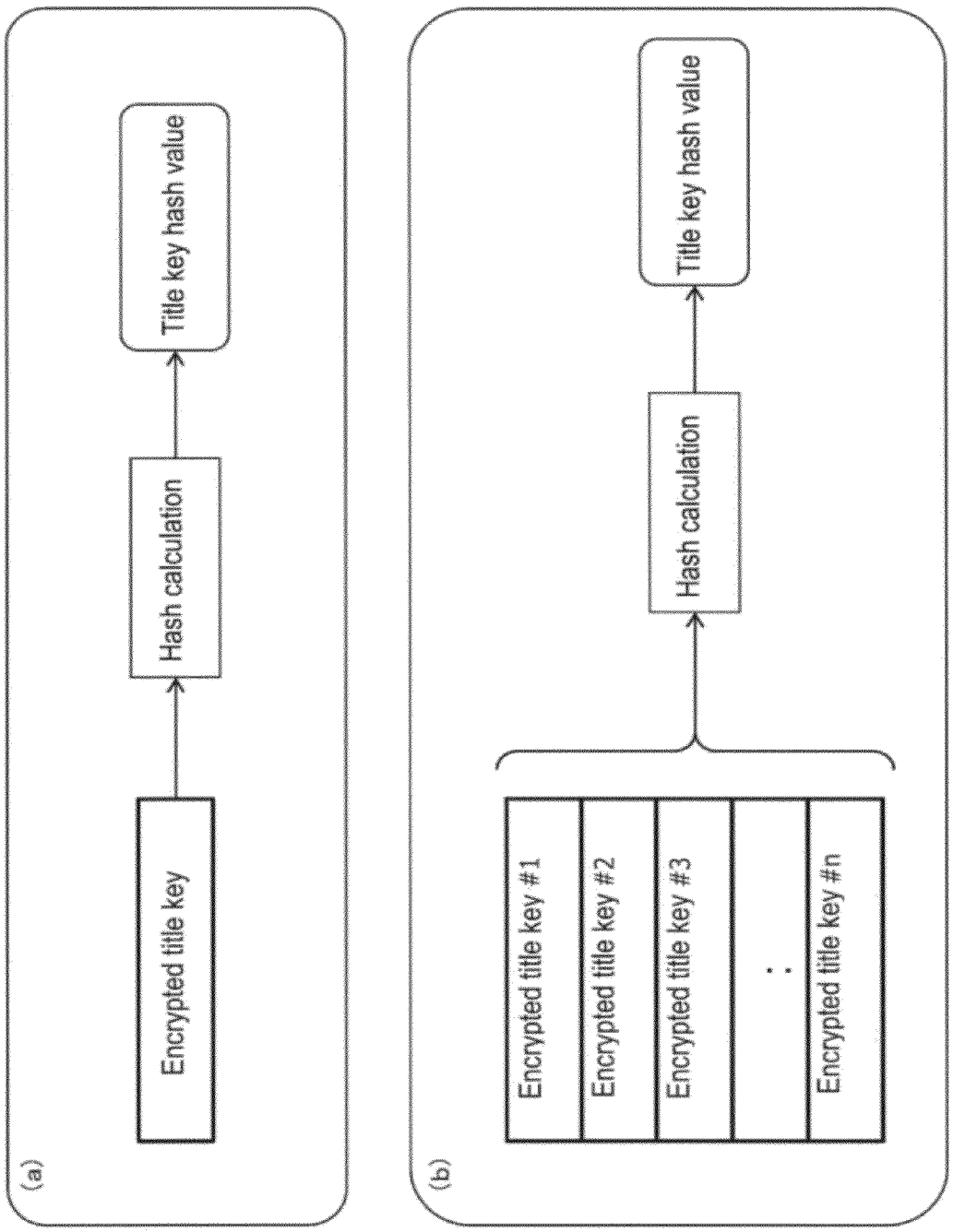
FIG. 9 is a diagram for describing an example of generation processing of a hash value of an encrypted title key.

A calculation processing example of the hash value is shown in FIG. 9.

For example, as shown in (a) in FIG. 9, when a single title key is set correspondingly to content, the hash value calculation is performed on the encrypted title key obtained by encrypting the single title key with the binding key.

Further, as shown in (b) in FIG. 9, when a plurality of title keys are set correspondingly to content, the hash value calculation is performed on a plurality of encrypted title keys obtained by encrypting each of the title keys with the binding key.

In this embodiment, the content server 100 calculates, in Step S31, a hash value of the encrypted title key generated in Step S24, and stores it in the protected area 310 of the memory card 300.

It is a title key hash value (title key hash) 312 within the protected area 310 of the memory card 300 in FIG. 8.

It should be noted that the title key hash value (title key hash) is sent from the content server 100 to the memory card 300 via a secure channel being a secure communication channel as data encrypted with a session key.

In this embodiment, as described above, within the protected area 310 of the memory card 300, the following data is stored:
the binding key 311, and
the title key hash value (title key hash) 312.

Each of the data will be read out by the reproduction apparatus that reproduces content, and used in the reproduction sequence set in advance.

[7. Content Reproduction Processing]

Next, the content record sequence described above with reference to FIG. 8, i.e., a content reproduction sequence when the following data:

the binding key 311, and the title key hash value (title key hash) 312, are stored in the protected area 310 of the memory card 300 will be described with reference to a flowchart shown in FIGS. 10 and 11.

Figure 10:
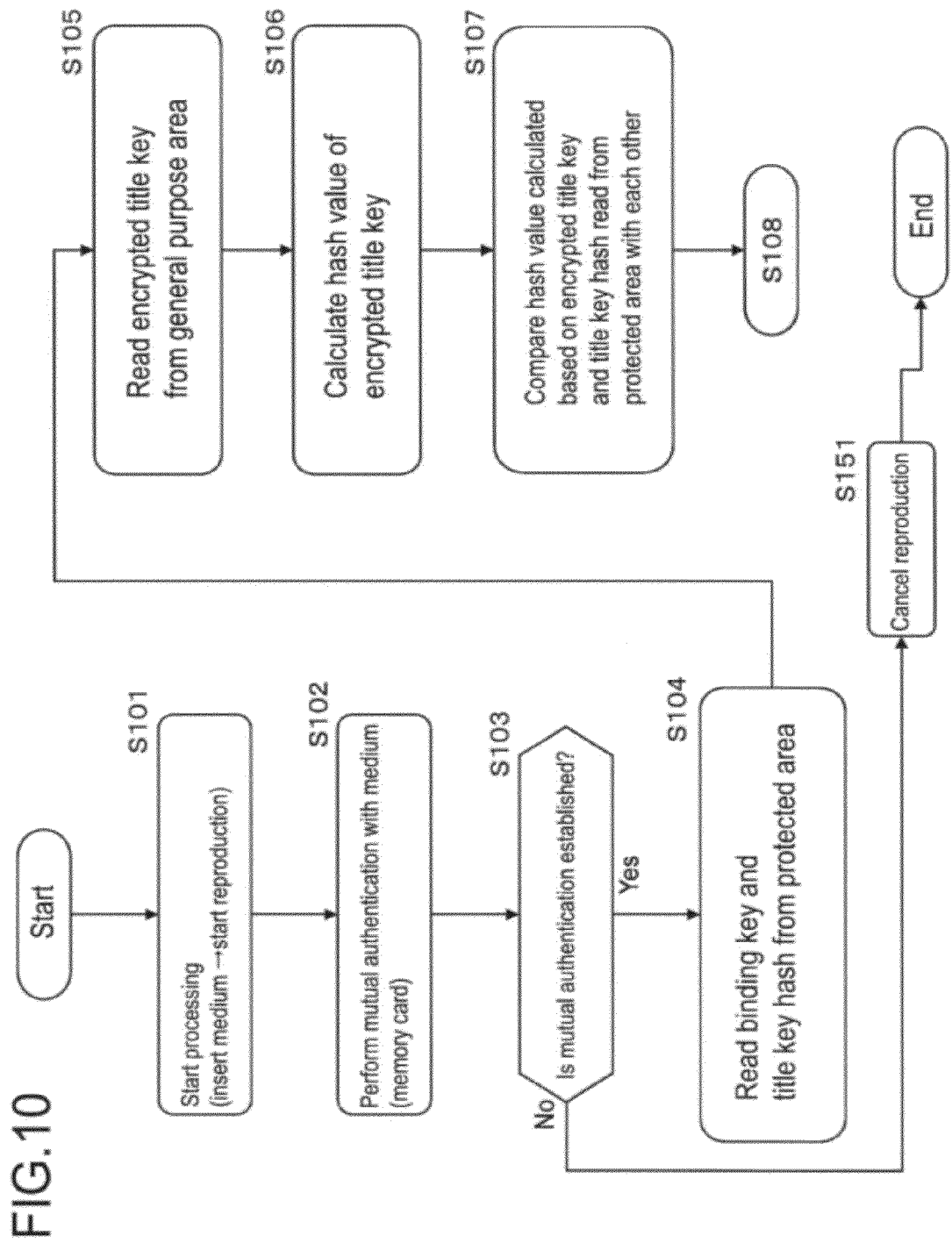
FIG. 10 is a flowchart for describing a content reproduction sequence.
Figure 11:
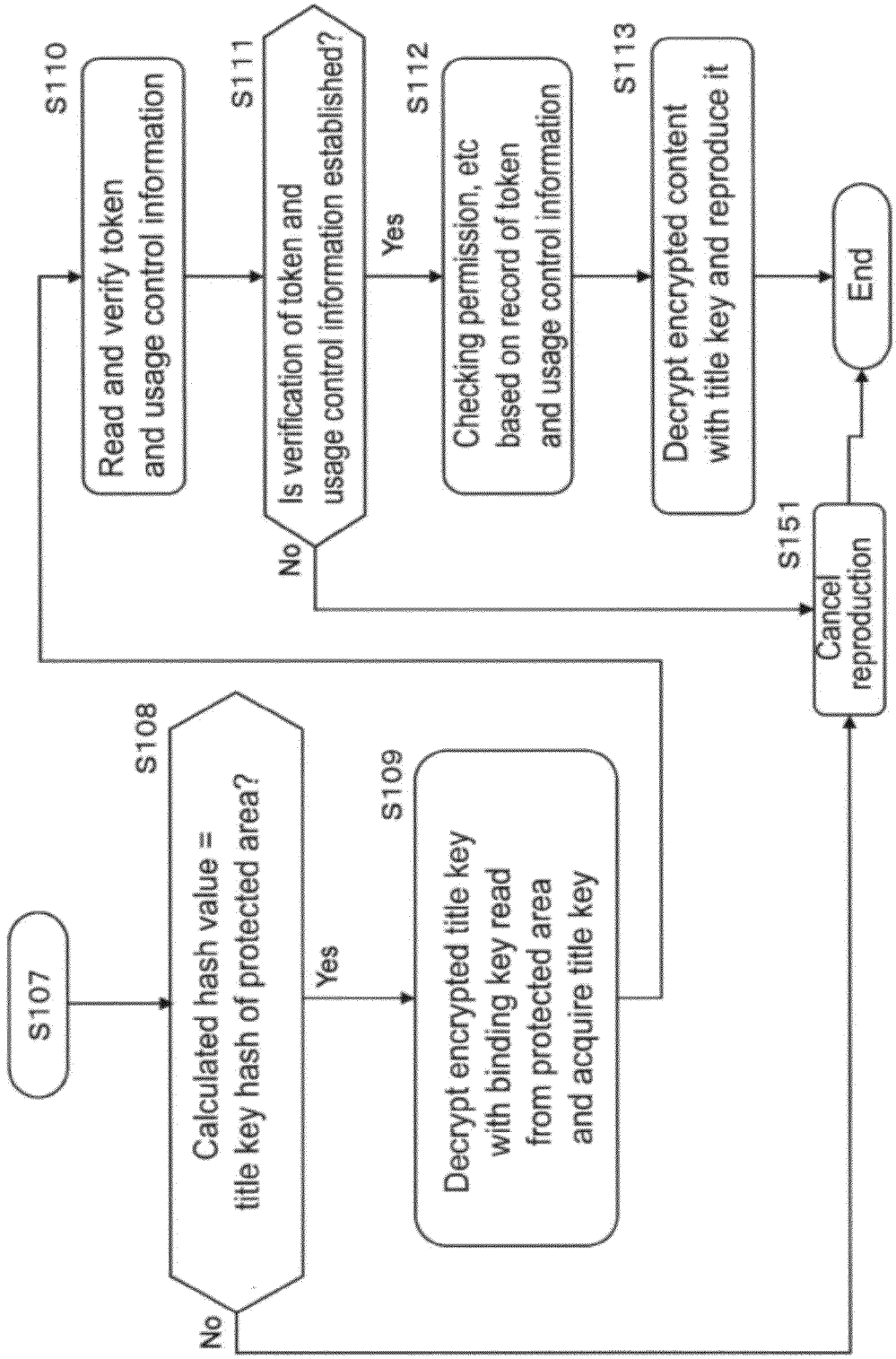
FIG. 11 is a flowchart for describing a content reproduction sequence.

The content reproduction processing shown in FIGS. 10 and 11 is performed in the reproduction apparatus with the memory card 300 in which the content, the key information, and the like are recorded being loaded thereto, in accordance with the content record sequence described above with reference to FIG. 8.

As the reproduction apparatus, various apparatus can be applied. For example, the reproduction apparatus is the recording and reproducing apparatus 22 or the PC 23 shown in FIG. 2, or a reproduction apparatus that performs only reproduction processing. It should be noted that in these reproduction apparatuses, a program for executing the reproduction sequence based on a flow which will be described later are stored. Various types of processing involved in reproduction for example, content decryption processing, management data verification, and content verification applying management data are performed according to the program.

A flowchart shown in FIG. 10 will be described.

In Step S101, a medium (memory card) in which content to be a reproduction target and management data are stored is loaded, and reproduction content is selected by the user designating the reproduction target content, for example.

In Step S102, between the reproduction apparatus and the memory card, mutual authentication processing is performed. For example, according to the public key encryption method, mutual authentication processing including, for example, exchanging the public key certificates of the both. It should be noted that the reproduction apparatus holds the certificate issued by the authentication station, in which the public key is stored, and a secret key. The memory card also receives a pair of the public key certificate and the secret key from the authentication station in advance, and is stored in its own storage.

When mutual authentication between the reproduction apparatus and the memory card does not succeed (determination in Step S103=No), the content reproduction processing is annulated.

When mutual authentication between the reproduction apparatus and the memory card succeeds and validities of the both are verified (determination in Step S103=Yes), the processing proceeds to Step S104.

The reproduction apparatus reads, in Step S104, a binding key and a title key hash from the protected area of the memory card.

Those are a binding key 311 and a title key hash 312 stored in the protected area 310 of the memory card 300, which are shown in FIG. 8.

Next, the reproduction apparatus reads, in Step S105, the encrypted title key from the general purpose area of the memory card.

It is the encrypted title key 322 stored in the general purpose area 320 of the memory card 300, which is shown in FIG. 8.

Next, the reproduction apparatus calculates, in Step S106, a hash value of the encrypted title key read from the general purpose area of the memory card. This hash calculation algorithm is performed using the same algorithm as that in the hash value calculation processing that is performed by the content server 100 in Step S31 described above with reference to FIG. 8.

Next, the reproduction apparatus compares the hash value calculated in Steps S107 and S106 and the title key hash read from the protected area of the memory card with each other.

Next, in Step S108 shown in FIG. 11, it is determined whether or not the following expression is established:

calculated hash value=title key hash stored in protected area.

When the above expression is established, it is determined that the encrypted title key is valid, and the processing proceeds to Step S109.

That is, when the above expression is established, it can be determined that it is surely the encrypted title key provided by the content server 100, which is described above with reference to FIG. 8.

For example, as described above, if the encrypted title key is re-encrypted with the leaked binding key, the above expression is not established.

In the hash value comparison in Step S108, when the matching does not succeed, it is determined that the encrypted title key may be falsified in an authenticated manner, and the processing proceeds to Step S151 and the content reproduction is annulated.

In the hash value comparison in Step S108, when the matching succeeds, it is determined that the encrypted title key is a correct key that is not falsified, and the processing proceeds to Step S109.

In Step S109, decryption processing of the encrypted title key applying the binding key read from the protected area of the memory card is performed to acquire the title key.

Next, the reproduction apparatus reads, in Step S110, the token and the usage control information from the general purpose area of the memory card, and executes signature verification for falsification verification that is set for such data.

When in Step S111, determined that the verification succeeds, the processing proceeds to Step S112. When the verification does not succeed, and the processing proceeds to Step S151, the reproduction processing is annulated.

When in Step S111, determined that the verification succeeds and the validities of the token and the usage control information are verified, the processing proceeds to Step S112. Then, based on constituent data of the token and the usage control information, content verification, check of permission processing, and the like are performed.

Next, in Step S113, the reproduction apparatus decrypts the encrypted content read from the general purpose area of the memory card by applying the title key acquired in Step S109, and executes content reproduction.

As mentioned above, in the content reproduction processing, the reproduction apparatus calculates the hash value of the encrypted title key recorded in the general purpose area of the memory card, and further performs comparison and matching processing on the title key hash value recorded in the protected area of the memory card in advance.

In this matching, when both the hash values match, the encrypted title key recorded in the general purpose area of the memory card is verified as one that is generated and provided by the server.

For example, when the encrypted title key recorded in the general purpose area of the memory card is an unauthorized key re-encrypted with the leaked binding key, the hash value matching does not succeed, and the content reproduction is annulated. Thus, unauthorized use of the content is prevented.

[8. Hardware Configuration Example of Each Apparatus]

Finally, referring to FIG. 12 and the like, a hardware configuration example of each apparatus that performs the above-mentioned processing will be described.

First, referring to FIG. 12, a hardware configuration example of the host apparatus that records or reproduces data by loading a memory card will be described.

A CPU (central processing unit) 701 functions as a data processor that performs various types of processing in accordance with a program stored in a ROM (read only memory) 702 or a storage 708. For example, the CPU 701 performs communication processing with the server, recording processing of data received from the server on the memory card (removable medium 711 in the figure), data reproduction processing from the memory card (removable medium 711 in the figure), and the like, which have been described in each of the above embodiments. In a RAM (random access memory) 703, a program, data, and the like to be executed by the CPU 701 are appropriately stored. The CPU 701, ROM 702, and the RAM 703 are connected to each other via a bus.

The CPU 701 is connected to an input/output interface 705 via the bus 704. To the input/output interface 705, an input unit 706 including various switches, a keyboard, a mouse, a microphone, and the like, and an output unit 707 including a display, a speaker, and the like are connected. The CPU 701 executes various types of processing in response to instruction inputs through the input unit 706, and outputs processing results to, for example, the output unit 707.

The storage 708 connected to the input/output interface 705 includes, for example, a hard disk. The storage 708 stores a program and various types of data to be executed by the CPU 701. A communication unit 709 communicates with an external apparatus via a network such as an Internet or a local area network.

A drive 710 connected to the input/output interface 705 drives the removable medium 711 such as a magnetic disk, an optical disk, a magneto optical disk, or a semi-conductor memory to acquire various types of data including recorded content, key information, and the like. For example, using the acquired content and key data, decryption/reproduction processing of content and the like are performed according to a reproduction program executed by the CPU.

Figure 13:
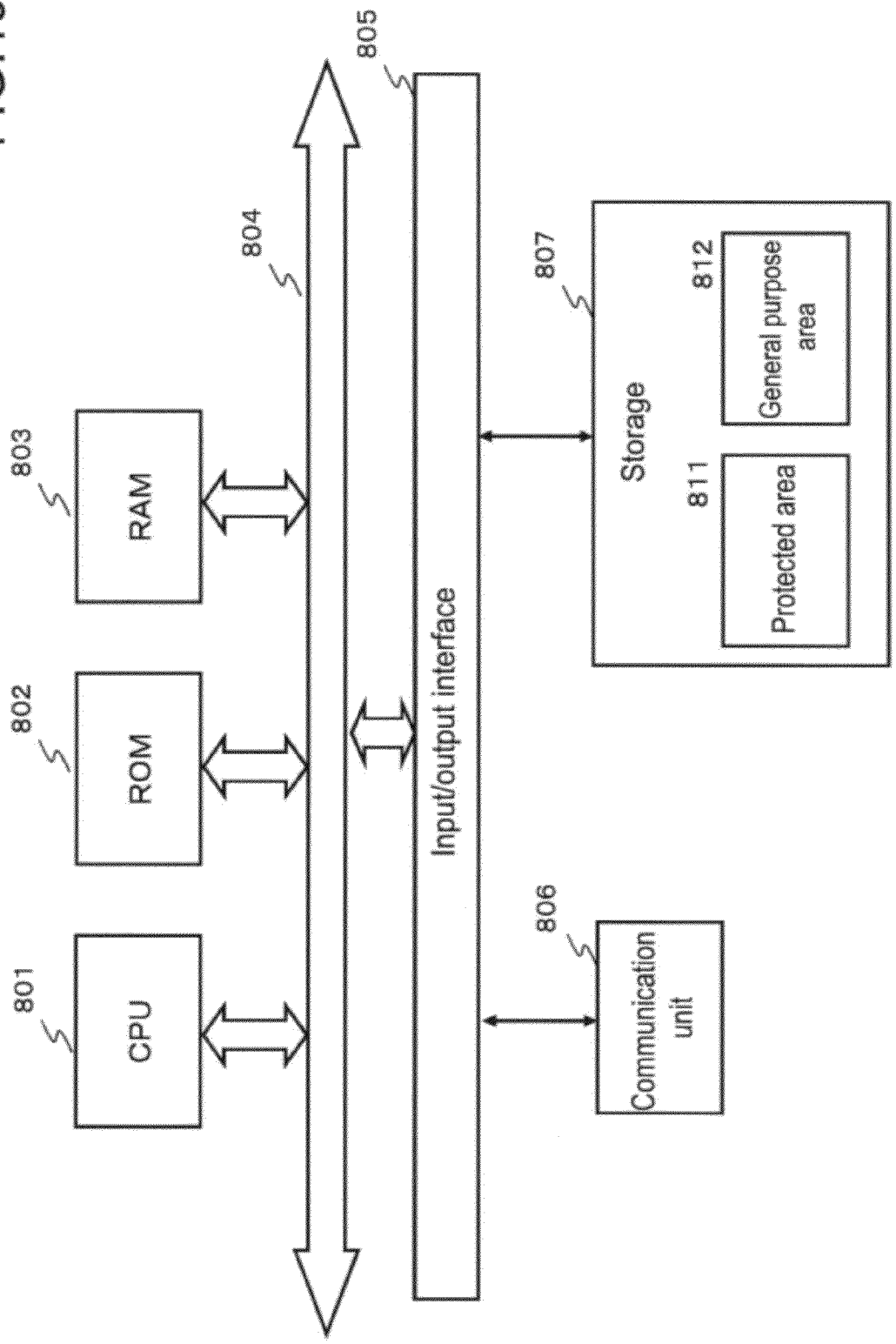
FIG. 13 is a diagram for describing a hardware configuration example of the memory card.

FIG. 13 shows a hardware configuration example of the memory card.

A CPU (central processing unit) 801 functions as a data processor that performs various types of processing according to a program stored in a ROM (read only memory) 802 or a storage 807. For example, the CPU 801 performs communication processing with the server and the host apparatus, write/read processing of data on the storage 807, determination processing of whether or not to permit access in units of a division area of the protected area 811 of the storage 807, and the like, which have been described in each of the above embodiments. In a RAM (random access memory) 803, a program, data, and the like to be executed by the CPU 801 are appropriately stored. The CPU 801, the ROM 802, and the RAM 803 are connected to each other via a bus 804.

The CPU 801 is connected to an input/output interface 805 via the bus 804. To the input/output interface 805, a communication unit 806 and the storage 807 are connected.

The communication unit 806 connected to the input/output interface 805 communicates with, for example, the server and the host apparatus. The storage 807 is a storage area of data, and includes, as described above, a protected area 811 to which access is limited and a general purpose area 812 which data can be freely recorded and read in/from.

Figure 12:
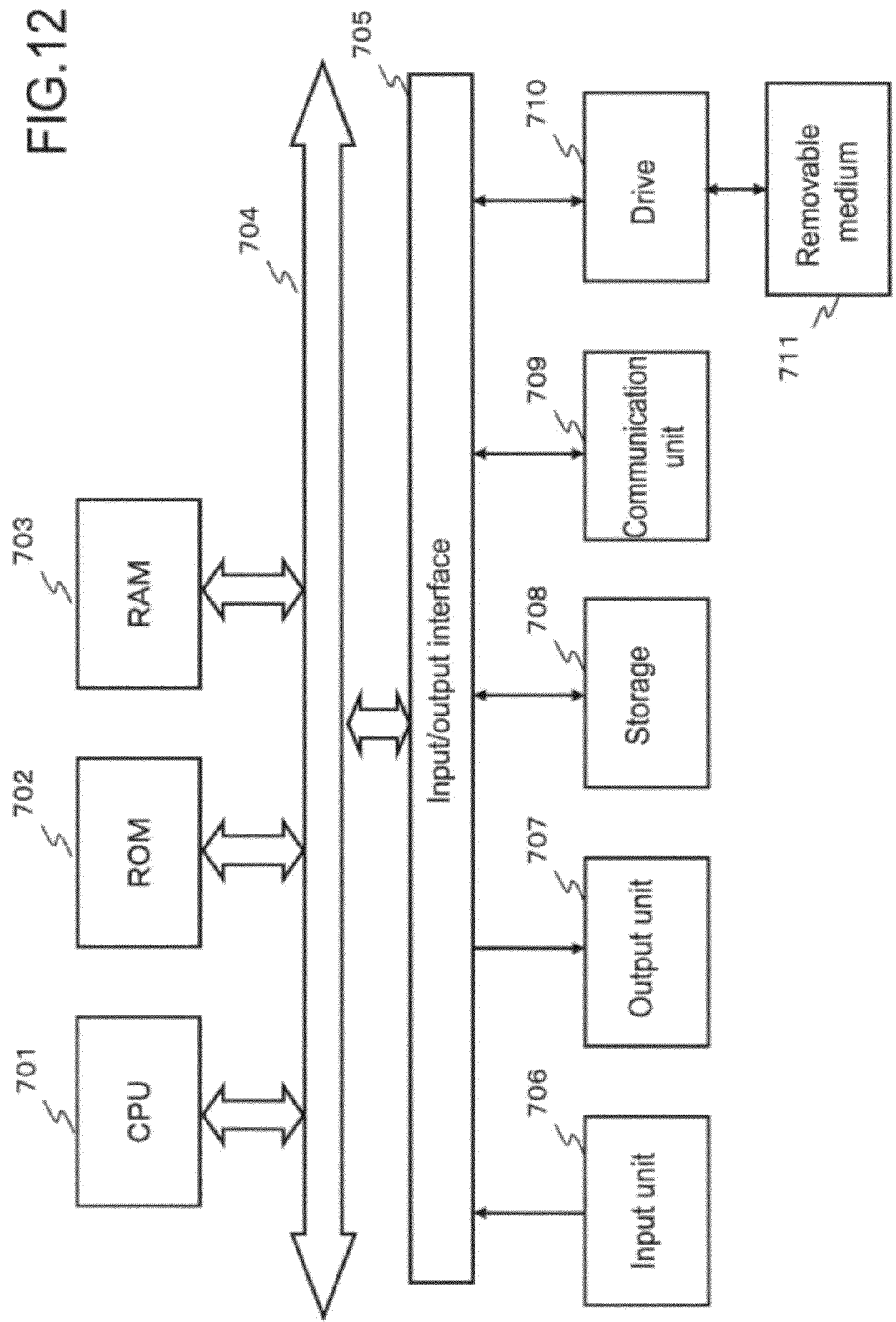
FIG. 12 is a diagram for describing a hardware configuration example of a host apparatus that loads the memory card and records or reproduces data.

It should be noted that the server can be realized by, for example, an apparatus having the same hardware configuration as that of the host apparatus shown in FIG. 12.

[9. Summary of Configuration According to Embodiment of Present Disclosure]

Hereinabove, referring to the particular embodiments, embodiments of the present disclosure have been described in detail. However, it will be apparent that modifications and alternatives of the embodiments can be made by those skilled in the art without departing from the gist of the present disclosure. Thus, the present disclosure has been disclosed merely as examples, and it should not be construed as a limitation. In order to understand the gist of the present disclosure, the scope of claims should be referred to.

It should be noted that the present disclosure disclosed herein can also employ the following configuration.

(1) An information processing apparatus, including:

a storage that is divided into a protected area to which access is limited and a general purpose area which is freely accessible, the storage being configured to store in the general purpose area encrypted content, and an encrypted title key obtained by encrypting a title key to be applied to decrypt the encrypted content, and store in the protected area a binding key applied to encrypt the title key, and a hash value of the encrypted title key; and a data processor configured to determine, in response to a request for access to the protected area from an external apparatus, whether or not to permit the access, and permit, only when access permission determination is made, the access to the protected area.

(2) The information processing apparatus according to (1) above, further including a memory card, in which the memory card is loaded into a reproduction apparatus, and the reproduction apparatus with the memory card being loaded thereto is allowed to determine whether or not to permit reproduction of the encrypted content based on a result of matching between the hash value stored in the protected area and a hash value calculated based on the encrypted title key.

(3) The information processing apparatus according to claim (1) or (2) above, in which the data processor determines, based on information recorded in a server certificate provided by a server configured to provide the encrypted content, whether or not to permit access to the protected area by the server, and stores in the protected area the hash value of the encrypted title key that is provided by the server.

(4) The information processing apparatus according to any one of (1) to (3) above, in which the server certificate includes a public key certificate in which a public key of the server is stored, the server certificate further including a certificate in which access permission information in units of a division area of the protected area is recorded.

(5) An information processing apparatus, including a data processor configured to execute content reproduction processing, the data processor being further configured to execute authentication processing on a memory card in which reproduction target content is stored, read out, from the memory card on which the authentication processing succeeds, an encrypted title key being data obtained by encrypting a title key applied to encrypt the encrypted content, and calculate a hash value of the encrypted title key, and execute matching between the calculated hash value and a hash value for matching that is acquired from the memory card, and determine, based on a result of the matching, whether or not to permit reproduction of the content.

(6) The information processing apparatus according to (5) above, in which the memory card is divided into a protected area to which access is limited and a general purpose area which is freely accessible, and the data processor reads out from the general purpose area the encrypted title key, and from the protected area the hash value for matching.

(7) The information processing apparatus according to (5) or (6) above, in which in the authentication processing on the memory card, the data processor outputs to the memory card a certificate in which access permission information with respect to the protected area is recorded.

(8) A server apparatus configured to execute content provision processing with respect to a memory card, the server apparatus including a data processor configured to generate encrypted content encrypted with a title key, a binding key being an encryption key for the title key, an encrypted title key obtained by encrypting the title key with the binding key, and a hash value of the encrypted title key, output the generated encrypted content, binding key, encrypted title key, and hash value to the memory card to be recorded in the memory card, and output a request for access to a protected area being an access-limited storage area within the memory card to record the hash value in the protected area based on access permission by the memory card in response to the request for access.

(9) The server apparatus according to (8) above, configured to hold a server certificate in which access permission information with respect to the protected area of the memory card is recorded, and provide the server certificate to the memory card to cause the memory card to determine whether or not to permit the access.

(10) An information processing system, including:

a content providing server configured to generate encrypted content encrypted with a title key, a binding key being an encryption key for the title key, an encrypted title key obtained by encrypting the title key with the binding key, and a hash value of the encrypted title key; and a memory card configured to store content provided by the content providing server, the memory card including a storage divided into a protected area to which access is limited and a general purpose area which is freely accessible, the memory card being further configured to store in the general purpose area the encrypted content and the encrypted title key, store in the protected area the binding key and the hash value of the encrypted title key, and verify, in response to a request for access to the protected area from the content providing server, a certificate provided by the content providing server, and determine whether or not to permit the access, the content providing server being further configured to output the generated encrypted content, binding key, encrypted title key, and hash value to the memory card.

In addition, a processing method for the above-mentioned apparatus and system and a program that causes the above-mentioned apparatus to execute processing are also included in the configurations of the present disclosure.

Further, the series of processing described herein can be executed by hardware, software, or a combination of the hardware and the software. When executing the processing by the software, it is possible to install a program recording a processing sequence into a memory in a computer incorporated in dedicated hardware for execution. Alternatively, a general purpose computer capable of executing various types of processing may be installed for execution. For example, the program can be recorded in a recording medium in advance. In addition to installation from a recording medium into a computer, a program can be received via a network such as a LAN (local area network) and an Internet to be installed into a recording medium such as a built-in hard disk.

It should be noted that various types of processing described herein is not limited to be executed in time series as described above. Depending on a processing ability of an apparatus that executes the processing or depending on needs, various types of processing may be executed in parallel or individually. Further, the system mentioned herein means a logical collective configuration including a plurality of apparatuses, and the apparatuses having respective configurations are not limited to be within a single casing.

As described above, according to configurations of an embodiment of the present disclosure, a configuration for preventing unauthorized use of content due to leak of a key applied to decrypt encrypted content can be realized.

Specifically, for example, in a memory card for storing content provided from a server, a protected area to which access is limited and a general purpose area which is freely accessible are set. The server generates encrypted content encrypted with a title key, a binding key being an encryption key for a title key, an encrypted title key obtained by encrypting the title key with the binding key, and a hash value of the encrypted title key, and outputs them to the memory card. The memory card stores in the general purpose area the encrypted content and the encrypted title key, and in the protected area the binding key and the hash value of the encrypted title key to determine, based on verification of the hash value, whether or not to permit reproduction of the content upon content reproduction.

With these configurations, for example, even if the binding key is leaked, when unauthorized processing such as encrypting the encrypted title key with the leaked binding key is performed, verification of the hash value can detect this unauthorized processing. Thus, it becomes possible to prevent unauthorized use of content.

The present disclosure contains subject matter related to that disclosed in Japanese Priority Patent Application JP 2011-118576 filed in the Japan Patent Office on May 27, 2011, the entire content of which is hereby incorporated by reference.

What is claimed is:

1. An information processing apparatus, comprising:

a storage unit comprising a protected area to which access is limited and a general purpose area, wherein the protected area comprises a plurality of divisions, the storage unit being operable to:

store in the general purpose area:
  encrypted content, and
  an encrypted title key to be applied to decrypt the encrypted content, and
store in the protected area:
  a binding key applied to encrypt the title key, and
  a hash value of the encrypted title key; and
a data processor operable to:
  determine, in response to a request for access to the protected area along with a certificate from an external apparatus, whether or not to permit the access, wherein the certificate comprises information corresponding to read permitted divisions and write permitted divisions among the plurality of divisions of the protected area; and
  permit, only when access permission determination is made, the access to the protected area.

2. The information processing apparatus according to claim 1, further comprising a memory card, wherein the memory card is loaded into a reproduction apparatus, and the reproduction apparatus with the memory card being loaded thereto is allowed to determine whether or not to permit reproduction of the encrypted content based on a result of matching between the hash value stored in the protected area and a hash value calculated based on the encrypted title key.

3. The information processing apparatus according to claim 1, wherein the data processor determines, based on information recorded in the certificate provided by a server configured to provide the encrypted content, whether or not to permit access to the protected area by the server, and stores in the protected area the hash value of the encrypted title key that is provided by the server.

4. The information processing apparatus according to claim 3, wherein the certificate includes a public key certificate in which a public key of the server is stored, the certificate including access permission information for each of the plurality of divisions of the protected area.

5. An information processing apparatus, comprising
a data processor operable to execute content reproduction processing, the data processor being further operable to:
  execute authentication processing on a memory card in which content is stored, wherein the memory card is divided into a general purpose area and a protected area composed of a plurality of divisions, wherein the authentication processing comprises determining, based on a certificate received from an external apparatus, whether or not to permit access to the protected area, the certificate comprising information corresponding to read permitted divisions and write permitted divisions among the plurality of divisions of the protected area;
  read out, from the memory card on which the authentication processing succeeds, an encrypted title key applied to encrypt the content, and calculate a hash value of the encrypted title key; and
  execute matching between the calculated hash value and a hash value for matching that is acquired from the memory card, and determine, based on a result of the matching, whether or not to permit reproduction of the content.

6. The information processing apparatus according to claim 5, wherein access to the protected area is limited, and the data processor reads out from the general purpose area the encrypted title key, and from the protected area the hash value and the binding key for matching.

7. The information processing apparatus according to claim 5, wherein, in the authentication processing on the memory card, the data processor outputs to the memory card the certificate in which access permission information with respect to the protected area is recorded.

8. A server apparatus configured to execute content provision processing with respect to a memory card, the server apparatus comprising:
a data processor operable to:
  generate encrypted content encrypted with a title key, a binding key being an encryption key for the title key, an encrypted title key obtained by encrypting the title key with the binding key, and a hash value of the encrypted title key;
  output the generated encrypted content, binding key, encrypted title key, and hash value to the memory card to be recorded in the memory card; and
  output a request for access to a protected area within the memory card along with a certificate to record the hash value in the protected area based on access permission by the memory card in response to the request for access, wherein the certificate comprises information corresponding to read permitted divisions and write permitted divisions among a plurality of divisions of the protected area.

9. The server apparatus according to claim 8, wherein the data processor is configured to hold the certificate in which access permission information with respect to the protected area of the memory card is recorded, and provide the certificate to the memory card to cause the memory card to determine whether or not to permit the access.

10. The server apparatus of claim 8, wherein the data processor is operable to provide a content revocation list and a server revocation list to be stored in the memory card.

11. The server apparatus of claim 10, wherein the content revocation list contains information about invalidated content.

12. The server apparatus of claim 10, wherein the server revocation list contains information about invalidated servers.

13. An information processing system, comprising:
a content providing server operable to generate:
  encrypted content encrypted with a title key,
  a binding key being an encryption key for the title key,
  an encrypted title key obtained by encrypting the title key with the binding key, and
  a hash value of the encrypted title key; and
a memory card operable to store content provided by the content providing server, the memory card comprising a storage divided into a protected area to which access is limited and a general purpose area, wherein the protected area comprises a plurality of division areas, the memory card being further operable to:
  store in the general purpose area, the encrypted content and the encrypted title key,
  store in the protected area, the binding key and the hash value of the encrypted title key, and
  verify, in response to a request for access to the protected area from the content providing server, a certificate provided by the content providing server, and
  determine, based on the certificate, whether or not to permit the access, wherein the certificate comprises information corresponding to read permitted divisions and write permitted divisions among the plurality of division areas of the protected area, the content providing server being configured to output the generated encrypted content, binding key, encrypted title key, and hash value to the memory card.

14. The information processing system according to claim 13, wherein the content providing server holds the certificate in which access permission information with respect to the protected area of the memory card is recorded, and provides the certificate to the memory card to cause the memory card to determine whether or not to permit the access.

15. An information processing method comprising:
in an information processing apparatus including a data processor and a storage unit comprising a protected area to which access is limited and a general purpose area:
executing access permission determination processing, in which, in response to a request for access to the protected area along with a certificate from an external apparatus, whether or not to permit the access is determined, and the access to the protected area is permitted only when access permission determination is made, wherein the protected area comprises a plurality of divisions, and wherein the certificate comprises information corresponding to read permitted divisions and write permitted divisions among the plurality of divisions of the protected area; and
storing, when the access permission determination is made, in the general purpose area:
encrypted content, and
an encrypted title key to be applied to decrypt the encrypted content, the encrypted content and the encrypted title key being data provided by the external apparatus, and
in the access protected area:
a binding key applied to encrypt the title key, and
a hash value of the encrypted title key, the binding key and the hash value being data provided by the external apparatus.

16. An information processing method of executing content reproduction processing in an information processing apparatus, the method comprising:
performing authentication processing on a memory card having a protected area comprising a plurality of divisions and a general purpose area in which content is stored, wherein the authentication processing comprises determining, based on a certificate received from an external apparatus, whether or not to permit access to the protected area, the certificate comprising information corresponding to read permitted divisions and write permitted divisions among the plurality of divisions of the protected area;
reading out, from the memory card on which the authentication processing succeeds, an encrypted title key obtained by encrypting a title key applied to encrypt encrypted content, and calculating a hash value of the encrypted title key; and
executing matching between the calculated hash value and a hash value for matching that is acquired from the memory card, and determining, based on a result of the matching, whether or not to permit reproduction of the content.

17. An information processing method for a server apparatus configured to execute content provision processing with respect to a memory card, the method comprising:
generating encrypted content encrypted with a title key, a binding key being an encryption key for the title key, an encrypted title key obtained by encrypting the title key with the binding key, and a hash value of the encrypted title key;
outputting the generated encrypted content, binding key, encrypted title key, and hash value to the memory card to be recorded in the memory card, and outputting a request for access to a protected area within the memory card along with a certificate to record the hash value in the protected area based on access permission by the memory card in response to the request for access, wherein the protected area comprises a plurality of divisions, and wherein the certificate comprises information corresponding to read permitted divisions and write permitted divisions among the plurality of divisions of the protected area.

18. A non-transitory computer-readable storage medium having stored thereon, a computer program having at least one code section for communication, the at least one code section being executable by a computer for causing the computer to perform steps to execute a process comprising:
execute access permission determination processing, in which in response to a request for access to a protected area of a storage unit along with a certificate from an external apparatus, whether or not to permit the access is determined, and the access to the protected area is permitted only when access permission determination is made, wherein the protected area comprises a plurality of divisions, and wherein the certificate comprises information corresponding to read permitted divisions and write permitted divisions among the plurality of divisions of the protected area; and
store, when the access permission determination is made in the access permission determination processing, in the access protected area:
a binding key applied to encrypt the title key, and
a hash value of the encrypted title key, the binding key and the hash value being data provided by the external apparatus, and
in the general purpose area:
encrypted content, and
an encrypted title key to be applied to decrypt the encrypted content, the encrypted content and the encrypted title key being data provided by the external apparatus.

19. A non-transitory computer-readable storage medium having stored thereon, a computer program having at least one code section for communication, the at least one code section being executable by a computer for causing the computer to perform steps to execute a process comprising:
execute authentication processing on a memory card comprising a protected area having a plurality of divisions and a general purpose area in which content is stored, wherein the authentication processing comprises determining, based on a certificate received from an external apparatus, whether or not to permit access to the protected area, the certificate comprising information corresponding to read permitted divisions and write permitted divisions among the plurality of divisions of the protected area;
read out, from the memory card on which the authentication processing succeeds, an encrypted title key being data obtained by encrypting a title key applied to encrypt the content, and calculate a hash value of the encrypted title key, and
execute matching between the calculated hash value and a hash value for matching that is acquired from the memory card to determine, based on a result of the matching, whether or not to permit reproduction of the content.

20. A non-transitory computer-readable storage medium having stored thereon, a computer program having at least one code section for communication, the at least one code section being executable by a computer for causing the computer to perform steps to execute a process comprising:

generate encrypted content encrypted with a title key, a binding key being an encrypted key of the title key, an encrypted title key obtained by encrypting the title key with the binding key, and a hash value of the encrypted title key;

output the generated encrypted content, binding key, encrypted title key, and hash value to the memory card to be recorded in the memory card; and output a request for access to a protected area within the memory card along with a certificate to record the hash value in the protected area based on access permission by the memory card in response to the request for access, wherein the protected area comprises a plurality of divisions, and wherein the certificate comprises information corresponding to read permitted divisions and write permitted divisions among the plurality of divisions of the protected area.

* * * * *